(12) United States Patent
Kukkamäki et al.

(10) Patent No.: US 8,480,854 B2
(45) Date of Patent: Jul. 9, 2013

(54) METHOD FOR CRYSTALLIZING A FILLER IN CONNECTION WITH A FIBER WEB PROCESS, AND AN APPROACH SYSTEM FOR A FIBER WEB MACHINE

(75) Inventors: Esko Kukkamäki, Kangasala (FI); Jouni Matula, Savonlinna (FI); Matti Sipilä, Kuusankoski (FI)

(73) Assignees: Upmkymmene Oyj, Helsinki (FI); Wetend Technologies Oy, Savonlinna (FI)

( * ) Notice: Subject to any disclaimer, the term of this patent is extended or adjusted under 35 U.S.C. 154(b) by 295 days.

(21) Appl. No.: 12/735,861

(22) PCT Filed: Feb. 19, 2009

(86) PCT No.: PCT/FI2009/050138
§ 371 (c)(1), (2), (4) Date: Aug. 20, 2010

(87) PCT Pub. No.: WO2009/103854
PCT Pub. Date: Aug. 27, 2009

(65) Prior Publication Data
US 2011/0000633 A1    Jan. 6, 2011

(30) Foreign Application Priority Data
Feb. 22, 2008 (FI) .................................... 20085166

(51) Int. Cl.
*D21H 11/00*    (2006.01)

(52) U.S. Cl.
USPC ....................................................... 162/181.2

(58) Field of Classification Search
USPC ............................................. 162/181.2, 232
See application file for complete search history.

(56) References Cited

U.S. PATENT DOCUMENTS

| 5,679,220 A | 10/1997 | Matthew et al. |
| 6,387,212 B1 | 5/2002 | Christian |
| 2004/0118542 A1 | 6/2004 | Richard |
| 2008/0023161 A1 | 1/2008 | Gather |

FOREIGN PATENT DOCUMENTS

| CN | 101091021 | 12/2007 |
| FR | 2 821 094 | 8/2002 |
| WO | 99/42657 | 8/1999 |
| WO | WO 02/066736 | 8/2002 |
| WO | 03/066962 | 8/2003 |
| WO | 2005/044728 | 5/2005 |
| WO | 2006/008333 | 1/2006 |

OTHER PUBLICATIONS

International Search Report for PCT/FI2009/050138, mailed Aug. 18, 2009.
Written Opinion of the International Searching Authority for PCT/FI2009/050138, mailed Aug. 18, 2009.
International Preliminary Report on Patentability for PCT/FI2009/050138, (Dec. 18, 2009), 13 pages.
U.S. Appl. No. 12/735,856, filed Feb. 19, 2009.
Chinese Office Action dated Sep. 13, 2012 with translation.

*Primary Examiner* — Mark Halpern
(74) *Attorney, Agent, or Firm* — Nixon & Vanderhye P.C.

(57) ABSTRACT

The method of the present invention for crystallizing a filler, especially in order to precipitate calcium carbonate on the surfaces of solids in the short circulation of a fiber web machine by feeding carbon dioxide and lime milk to the liquid flow of the short circulation and allowing them to react with one another, is characterized in that the feed system, the mixing method and/or mixing rate of the chemicals are selected such that a size distribution of the calcium carbonate crystals suitable for the purpose is obtained. Moreover, the invention relates to an approach system for a fiber web machine applying this method, characterized in that it is provided with devices for feeding and mixing carbon dioxide and lime milk into the liquid flow at such a rate that the applicable size distribution of the calcium carbonate crystals is obtained.

21 Claims, 12 Drawing Sheets

Figure 1:
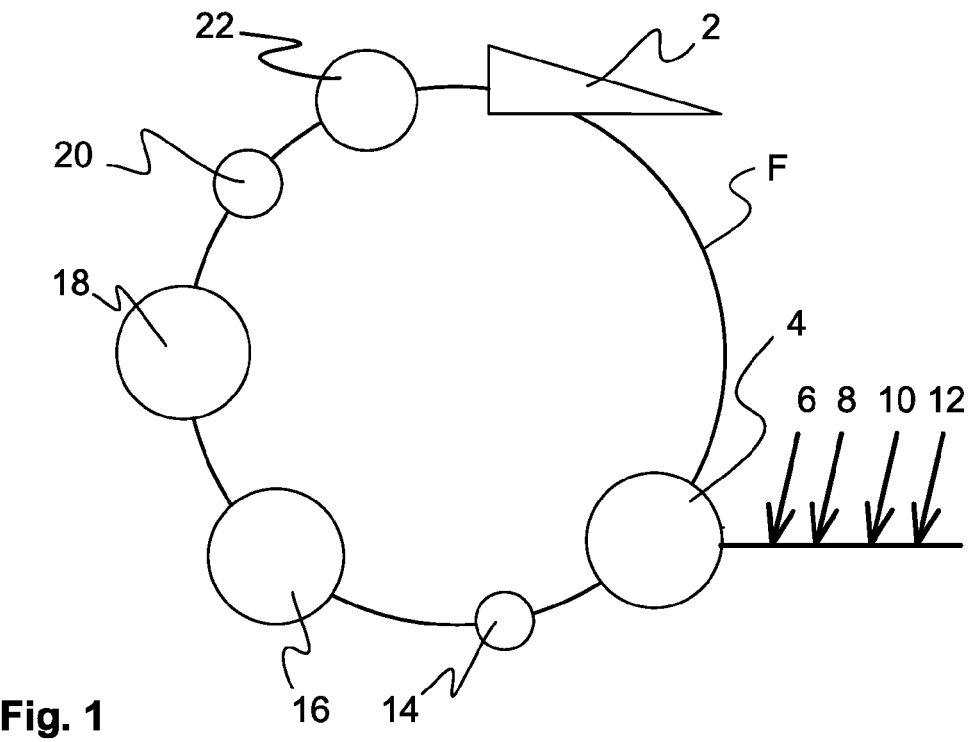

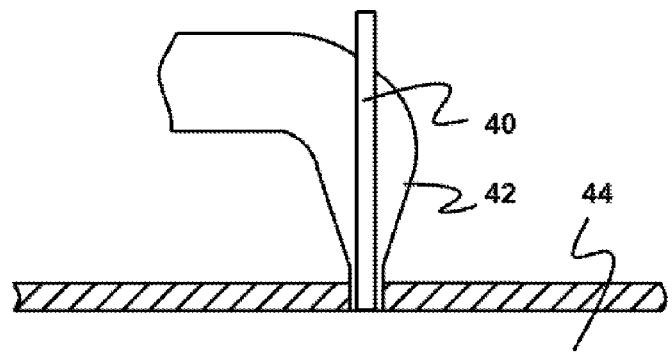
Fig. 18
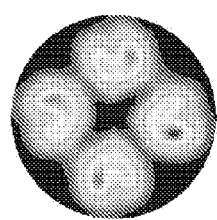 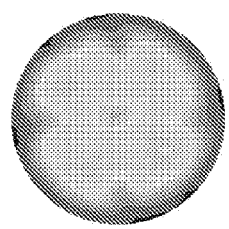 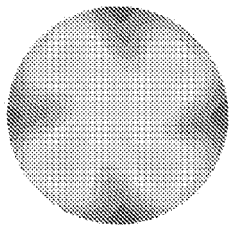 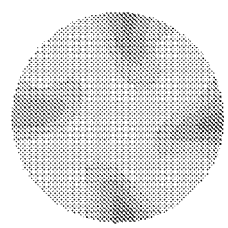
Fig. 19a     Fig. 19b     Fig. 19c     Fig. 19d

METHOD FOR CRYSTALLIZING A FILLER IN CONNECTION WITH A FIBER WEB PROCESS, AND AN APPROACH SYSTEM FOR A FIBER WEB MACHINE

This application is the U.S. national phase of International Application No. PCT/FI2009/050138 filed 19 Feb. 2009 which designated the U.S. and claims priority to FI Application No. 20085166 filed 22 Feb. 2008, the entire contents of each of which are hereby incorporated by reference.

Subject matter disclosed and claimed herein was made pursuant to a joint research agreement between WETEND TECHNOLOGIES, OY and UPMKYMMENE OYJ.

The object of the above-mentioned invention is a method for crystallizing a filler, especially calcium carbonate, in connection with a fiber web process, and an approach system for a fiber web machine. The invention especially relates to a method for continuous production of PCC used as a filler in the production of paper and cardboard in connection with a paper machine process.

Calcium carbonate is generally used in paper production both as a filler and a coating material, due to factors such as the high brightness of carbonate and its favorable price, among other things. Calcium carbonate may be produced by grinding either chalk, marble or lime stone, whereby it is referred to as ground calcium carbonate, commonly abbreviated as GCC (Ground Calcium Carbonate). Another way of producing calcium carbonate is a chemical method, in which, e.g., calcium ions present as a second component of calcium hydroxide and carbonate ions obtained when dissolving carbon dioxide in water are allowed to react, whereby the resulting calcium carbonate is precipitated from the solution as crystals, whose shape depends on the reaction conditions, among other things. The final product of this production method is referred to by the name PCC, which is an abbreviation of the words Precipitated Calcium Carbonate. This invention focuses on the production of PCC and its specific use as a filler in paper.

PCC production has traditionally been done separate from actual paper production. Until now, PCC has been produced either in its own separate plant located close to a paper mill from where the PCC slurry is conveyed by pumping trough pipelines to paper manufacture, or in a similar plant, from where the PCC slurry is transported by tank trucks to paper mills located at a distance. PCC produced by this method requires the use of retention aids in the paper production, so that PCC is able to adhere to the fibers, regardless of whether they are chemically or mechanically produced cellulose fibers. The above briefly described conventional way of producing PCC involves problems in addition to the already mentioned problem related to the use of retention aids. The transport of PCC by tank trucks to a paper mill from a chemical plant causes transport costs and requires use of dispersion agents and biocides. The use of these additives degrades the properties of PCC.

Construction of a separate PCC plant in connection with a factory is an expensive investment and requires many individuals working around-the-clock. A PCC plant also consumes a lot of fresh water and energy.

Thus, in order to reduce the production cost of paper, many different proposals for producing PCC directly at a paper mill have been made recently, thereby eliminating at least the transport costs of PCC from the papermaking cost structure. It has also been noticed that the production of PCC in the presence of fiber suspension leads to improved adhesion of the PCC crystals to fibers, and therefore reduces at least the need for retention aids, and sometimes their use can even be entirely avoided. The following description discusses several patent documents addressing the production of PCC in connection with paper manufacture.

WO-A1-0107365 discusses the conventional PCC production method. Generally speaking, this method assumes the formation of a suspension containing calcium ions, in which calcium exists both in dissolved ion form and as an insoluble solid. This suspension is supplied to a positive pressure reactor, into which gaseous carbon dioxide is introduced, and whose content is mixed continuously. Thus, the reaction of carbon dioxide and water creates carbonate ions, whose further reaction with calcium ions creates calcium carbonate. The process is run on a batch-type basis according to the pH value. In the initial stage, i.e., before feeding carbon dioxide, the pH value of the suspension present in the reactor is roughly above 12. Feeding carbon dioxide into the reactor is continued until the pH drops to the 6.5-7.5 level, whereupon the PCC suspension may be pumped through a screen to a storage tank for the papermaking process.

Calcium ions originating from the process described generally above may be either calcium oxide or calcium hydroxide. The document explains how the burned lime (CaO) is conveyed to the PCC plant by train, truck or pneumatic pipeline from a local silo. The burnt lime is slaked by mill water in a slaker in order for calcium hydroxide to form. If required, steam may be added in order to ensure a proper reaction temperature. The lime milk obtained from the slaker is pumped through a screen, in which the large-sized particles are removed, and into the aforesaid reactor. Besides the $CO_2$ introduced as a pure liquid into the process, any suitable flue gas purified in an applicable manner may be used as a source of carbon dioxide being fed to the reactor.

WO-A1-9935333, WO-A1-9945202 and WO-A1-0047817 discuss the protection of either ground calcium carbonate or PCC with acid paper production in mind. These documents assume that calcium carbonate is relatively stable under alkaline conditions, and that the low pH (roughly 8 and below) tends to split the calcium carbonate into calcium ions and carbonate ions, so that the suspension releases carbon dioxide, whose formation is noticeable as stock foaming. According to the document, it was noticed that by using carbon dioxide, whether in gaseous form or dissolved in water, calcium carbonate may be stabilized such that the pH of the paper production may be reduced to within a range of 6.5-7.5 without the risk of calcium carbonate decomposing.

U.S. Pat. No. 5,223,090 discloses the precipitation of PCC in fibers occurring at a paper mill, utilizing the hydrophilic properties of virgin pulp fibers by first mixing virgin pulp with lime milk and bringing the suspension with a water content of 40-95% into contact with a gaseous or liquid reagent (carbon dioxide), under vigorous mixing, in a pressurized tank in order to precipitate the filler particles in the fibers and especially their lumen. As a mixer alternative, a pressurized pulp grinder is disclosed.

U.S. Pat. No. 5,262,006 discusses a papermaking process, where in the recycled-fiber- or reject-containing suspension there is calcium sulfate or gypsum, which is used as raw material in the paper coating. The aim of this document is to convert at least a part of the recycled plaster to calcium carbonate. This is done by supplying alkali metals or ammonium carbonate to the suspension. Moreover, carbonate or hydrocarbonate ions are supplied to the paper making stock in order to form PCC, which causes the precipitation of calcium carbonate in the fibers. The carbonate ions, in turn, may be produced in a known manner from lime milk and carbon dioxide by first supplying lime milk and then carbon dioxide to the suspension. The relevant fiber suspension is either used as such or mixed with other cellulose components for paper production.

U.S. Pat. No. 5,558,782, U.S. Pat. No. 5,733,461, U.S. Pat. No. 5,830,364 and EP-A1-0658606 describe a process, in which alkaline earth metal carbonate is precipitated in the papermaking filtrate, so that carbonate adheres to the filtrate fines, which may then be more easily reused. In fact, the document teaches how to feed first lime milk and then carbon dioxide to the filtrate, where the resulting PCC is precipitated in filtrate fines. Following precipitation of PCC, either the fines containing PCC are separated from the precipitate as a thick fraction, which along with another filler is supplied for addition to the paper to be produced, or the filtrate precipitated by PCC is supplied as such to the paper production in order to be used as a filler or coating pigment.

U.S. Pat. No. 5,665,205 discusses methods aimed at improving the brightness and purity of recycled fibers used in paper production. It assumes the addition of calcium carbonate (calcium oxide or calcium hydroxide) and carbon dioxide to recycled fibers present in a consistency of 0.1-5% in a mixing reactor at a temperature of 15-80° C., the carbon dioxide and lime milk molar ratio varying between 0.1-10. By changing the reaction conditions, the size and shape of the calcium carbonate crystals may be controlled. Likewise, by changing the chemical feed order, the reaction pH may be controlled.

U.S. Pat. No. 5,679,220 discusses the process already described above (U.S. Pat. No. 5,665,205) from slightly different angles. In this document, a suspension is formed from the papermaking fiber component, whose consistency is, as above, below 5%. Lime milk is formed from calcium hydroxide, or the like, in a separate vessel. The fiber suspension and lime milk are mixed vigorously by shear forces, whereby a static mixer is considered sufficient for generation of the forces, even though pumps and other mixers may also be considered, with a gaseous reagent in a subordinate flow reactor, whereby calcium carbonate precipitates in the fibers. Either pure carbon dioxide or flue gases or carbon dioxide obtained from other similar sources are used as gaseous reagents. The document proposes that lime milk and carbon dioxide be supplied to a pipe reactor in different arrangements depending on which reactor conditions, mainly pH, are desired. Carbon dioxide may, for example, be dosed in many different steps to the reactor.

U.S. Pat. No. 5,731,080 and U.S. Pat. No. 5,824,364 especially discuss precipitation with calcium carbonate of such a fiber suspension, whose fibers contain an ample amount of microfibrils. These microfibrils are said to exist in the fibers either naturally or as the result of. grinding. In the process described in the document, the fiber suspension is supplied in a consistency of 0.1-30% to a batch-type mixing reactor, receiving also lime milk. Preferably, the consistency of the suspension in the reactor is roughly 2.5%. When the reactor temperature has stabilized vigorous mixing is initiated, whereby carbon dioxide is fed to the reactor and the resulting PCC crystals precipitate on the fiber surfaces. The PCC-charged fiber suspension may be used in the paper production added in normal fiber suspension.

US-A1-20050045288 discusses bleached mechanical pulp and its production such that yellowing characteristic of mechanical pulp does not compromise the final product. The objective is optimal coating of the mechanical pulp fibers with PCC. An essential feature of the pulp described in the document is that it has been ground such that the fiber surface is well fibrillated. In the method according to the document, lime milk is added to the fiber suspension by light mechanical stirring, whereupon the consistency of the mixture is adjusted to below 10%, preferably to about 2.5%. Subsequently, gaseous carbon dioxide is added to the diluted suspension, maintaining stronger mechanical mixing than before, until all the lime milk has converted to calcium carbonate, which crystallizes in the fibers. The mixing method described above is primarily related to mixing performed on batch-type basis in a special container. According to this document, mixing may also be performed as a continuous process involving a pipe reactor containing the necessary amount of static mixers. Mixing may, for example, be carried out such that lime milk is fed to the fiber suspension flowing in the pipe, and then mixed by a static mixer with the stock. Subsequently, carbon dioxide is fed from one or more successive points to a flow, whereby static mixing occurs at each point of feeding. The stock produced in the manner described above is used as one component in paper production.

WO-A1-9942657 discusses the handling of paper machine filtrate such that the filtrate is split in two fractions. Following fractionation, lime milk is mixed into bright filtrate, and carbon dioxide into the fraction containing fines and fibers. Both these fractions are supplied to a crystallization reactor, which also receives some of the fiber components of the paper production, and whose operation may be either continuous or batch-type. In the solution disclosed in this document, the calcium carbonate going to the fraction containing the paper machine filtrate fines and fibers is converted, when treated with carbon dioxide, to calcium bicarbonate, which dissolves in the filtrate, whereupon the solids may be separated from the filtrate, if desired. Optionally, calcium bicarbonate may be precipitated back to calcium carbonate (PCC).

WO-A1-0112899 discusses the adhesion of a mineral-based filler to a cellulose suspension. The papermaking method disclosed in this document uses a cellulose fiber suspension containing alkali and/or alkali earth metal carbonates, bicarbonates or silicates. In this method, the mineral hydroxide is added to a fiber suspension, so that the mineral filler carbonate may be precipitated in the fibers. The precipitation of carbonate is based on utilizing sodium ions. The document mentions as sodium ion sources a suspension obtained in a recycled fiber process, in which sodium occurs as bicarbonate, or sodium naturally present in paper making stock, or sodium obtained from ground water. In any case, sodium ions flow in the water circulation in the papermaking machine. When, for example, calcium hydroxide is fed to a sodium-ion and bicarbonate-ion-containing fiber suspension, calcium carbonate and sodium carbonate is formed. Sodium carbonate, in turn, may react further with calcium hydroxide, thereby forming calcium carbonate and sodium hydroxide. The resulting calcium carbonate is precipitated in a known manner in the fibers of the fiber suspension. When the precipitation reaction has been completed, paper making stock is carried to the papermaking machine, where carbon dioxide is fed to the obtained precipitate in order to control the pH value, whereby sodium hydroxide obtained as a by-product in the precipitation reaction converts initially to sodium carbonate and further, when reacting with carbon dioxide and water, to sodium bicarbonate, whereupon the filtrate is ready to be recycled for paper production.

WO-A1-02066735 discusses paper production from paper fibers and calcium carbonate. To solve the problem in the document, an aqueous solution of calcium bicarbonate and/or carbon dioxide and calcium hydroxide is mixed in order to precipitate calcium carbonate as vaterite crystals, followed by immediate addition of paper fibers, whereby the vaterite crystals convert to calcite crystals adhering to the fibers. The paper making stock formed in this way may be supplied to a papermaking machine in order to produce paper.

WO-A1-03033815 refers to the document described above and discusses cellulose products consisting of cellulose fibers and PCC produced in connection with the papermaking process. According to this document, the process described there allows PCC to be deposited on any fiber surface, both inside and outside the fibers. The document describes a few different PCC precipitation alternatives.

In the first of the mentioned alternatives, calcium carbonate and carbon dioxide are mixed in a first mixer with the fiber suspension, whose consistency entering the process is 3-6%, such that carbon dioxide completely dissolves in the suspension. Subsequently, calcium hydroxide is mixed with the suspension and the suspension mixed in a second mixer, whereby the resulting calcium carbonate precipitates in the fibers.

In the second alternative, the mixture consisting of calcium carbonate and carbon dioxide is mixed in a first mixer, whereby carbon dioxide completely dissolves, and at least a part of the calcium carbonate converts to calcium bicarbonate. Finally, the mixture is fed from the first mixer to a second mixer, to which a fiber suspension and calcium hydroxide are also supplied, whereby the resulting calcium carbonate precipitates in the fibers.

In the third alternative, calcium carbonate and carbon dioxide are mixed with one another before being supplied, together with the fiber suspension, to the first mixer. This means, in practice, that a calcium bicarbonate solution is mixed with the fiber suspension. After the first mixer, calcium hydroxide is mixed in with the fiber suspension and the suspension supplied to a second mixer, in which calcium carbonate is formed, which precipitates in the fibers.

In the fourth alternative, PCC is precipitated in a short-fiber fraction and supplied to a mixing tank, in which the short-fiber fraction is mixed into the long-fiber fraction.

And, in the fifth alternative, PCC is precipitated in short-fiber pulp, and subsequently the short-fiber fraction is supplied to the multi-layer paper machine headbox, whereby, for example, a product may be produced, whose middle layer is of a short-fiber fraction and the surface layers of a short-fiber or filler-containing fraction.

WO-A1-0200999 discusses a papermaking process, in which virgin pulp is added to a flow containing at least short-fiber pulp and/or filler. This mixture is thickened and supplied to a special reactor, where calcium and carbonate ions are added to the mixture, the ions originating from, e.g., lime milk and carbon dioxide. This flow containing short-fibered material and/or a filler may be, e.g., a filtrate from a paper machine wire section. As other short-fiber sources are mentioned various chemicals and mechanical virgin pulp types of hardwood and softwood both before and after grinding, synthetic pulps, as well as recycled fibers and rejects. According to one embodiment described in this document, the precipitation of PCC in fibers takes place in a static mixer placed in a pipe flow, to which the mixture of the short-fiber/filler-containing pulp and virgin pulp described above, dilution water and lime milk is provided, such that the consistency of the suspension is in the 1-3.5% range. After the first static mixer, carbon dioxide is fed to this flow, which is mixed with the suspension in a second static mixer. The PCC-charged suspension obtained from the lime is stored in an intermediate tank, from which it is conveyed in diluted form to the papermaking machine.

EP-B1-835343 and WO-A1-03035979 discuss the production of filler-containing chemical pulp. It is based on the desired chemical pulp being produced by mixing filler, into which PCC has been precipitated, with chemical pulp. This filler is obtained by grinding the chemical or mechanical pulp such that so-called noil fibrils are produced, whose Bauer-McNett number is about P100. Calcium carbonate is mixed with this pulp containing noil fibrils, whereupon the pulp is mixed with the chemical pulp, and the mixture dried for delivery to a paper mill.

WO-A1-02097189 discusses a calcium-containing filtrate of the papermaking machine such that the calcium ions are unable to accumulate in the water circulation of paper production. This object is realized such that the pH of the filtrate is raised to at least a value of 9 without using calcium oxide or calcium hydroxide. Subsequently, carbon dioxide is mixed with the process water, which precipitates a substantial part of the calcium ions as calcium carbonate, which is removable from the process.

WO-A1-2005005726 discusses the production of paper from paper making stock, into which PCC has been precipitated dioxide in a special mixing device by utilizing lime milk and carbon dioxide.

WO-A1-2005033403 discusses a filler composition formed from a substrate and an alkali earth metal carbonate precipitated therein. The substrate may be, e.g., a paper machine filtrate containing fibers and/or fines, or even long-fiber virgin pulp. In the filler production process, solids are first removed from lime milk, after which lime milk is combined with the substrate, and PCC is precipitated from the mixture by means of carbon dioxide.

WO-A1-2005044728 describes only the production of PCC either without its precipitation in fibers or by precipitating it in a fiber flow leading to the papermaking machine. The document describes how lime milk is produced and screened free from solids, and the handling of flue gas in scrubbers and coolers, before both are carried to carbonation step at a pressure of about 1-7 bars, in which PCC is produced. If desired, pulp, in which PCC is precipitated, may also be conveyed to the carbonation step, and subsequently the pulp charged with PCC may be carried to a papermaking machine.

WO-A1-2005061386 discusses the production of PCC such that the object is to increase the crystal size and decrease the characteristic surface area. It is based on a mixture of lime milk and a suspension, which is carbonated by carbon dioxide in several successive mixing reactors in order to realize the object. The suspension may be a filtrate obtained from a papermaking machine, or another appropriate solid, or a suspension containing virgin or recycled fibers. The end product resulting from the process may be used, e.g., with other fillers and additives, as well as different fiber suspensions, in the paper production.

In other words, prior art teaches how to handle a paper machine filtrate such that PCC is precipitated in the solids therein, whether they be fiber-based or other particulate material, such as a filler, so that the solids may be more easily separated from the filtrate, or such that the solids may be utilized, e.g., as a papermaking filler.

There are also documents known in which PCC is precipitated into a fraction of the paper production, which is then conveyed either as such to a papermaking machine, or to a mixing tank for mixing with other fractions before being conveyed to the papermaking machine.

The precipitation of PCC into a fiber-containing suspension is mostly done according to the prior-art documents, such that calcium ions are arranged in the suspension, e.g., by means of lime milk, whereupon the suspension is treated by a chemical, mostly carbon dioxide, releasing or forming carbon ions. Thus, calcium carbonate crystals, which adhere to the fibers, and more specifically, to the irregularities and fibrils on their surface, are formed. Typically, this method is applied such that lime milk, and only thereafter carbon dioxide, are mixed with the fiber-containing suspension.

Another option, suggested in some documents, is the so-called bicarbonate method. In this method, carbon dioxide is mixed with liquid/filtrate/suspension containing calcium carbonate or some other suitable carbonate, whereby the carbonate is converted to bicarbonate. When calcium or some other hydroxide suited for the purpose, e.g., lime milk, is added to the solution/suspension, carbonate is formed in the reaction of hydroxide and bicarbonate.

However, both the conventional and bicarbonate methods have their own weaknesses. The bicarbonate method requires the use of sodium in at least some form, which by no means is always present in the paper making stock without separate addition. It is our understanding that in practice the same problems appear in to the bicarbonate method as in the conventional method discussed below. The conventional method, in which lime milk, and only thereafter carbon dioxide, are mixed first with an applicable liquid or suspension, is not able, in our opinion, to control the formation of carbonate crystals in an as optimal way as is required in the production of more demanding products. Moreover, the rate of the precipitation process has not been necessarily sufficient, when attempting to perform the precipitation of PCC directly in the paper machine short circulation without a separate, longer-lasting side circulation.

In our opinion, the slow rate of the precipitation reactions in the present processes is caused by the way in which the chemicals are mixed. The prior-art solutions attempting to perform precipitation of PCC in a medium flowing in a pipe disclose that both a mere pipe flow, and either static or dynamic mixers arranged in a pipe, are sufficient for causing an adequately good mixing. However, the end result is that production of PCC by these methods is not such that it would be ready for general marketing or use in paper mills.

For example, in the prior-art document U.S. Pat. No. 5,679,220 referred to above, it says that carbon dioxide is allowed to discharge into a pipe mixer such that the fiber suspension flowing in the pipe sweeps up the carbon dioxide entering the pipe, and the pipe flow in itself mixes the carbon dioxide as small gas bubbles with the stock. In the test equipment of this US document, in which the diameter of the flow pipe is between half an inch and six inches, a reaction time of about one to two minutes is needed, which is altogether too long in terms of the paper machine short circulation, in which the flow velocity of the stock in the pipe is roughly 3-6 m/s. In the mixing method according to this US document, the following occurs in practice, when carbon dioxide is swept along with the flow. After the point of adding carbon dioxide, a uniform gas wake initially forms, which slowly breaks into gas bubbles that gradually burst further into small bubbles. However, long after feeding the carbon dioxide, a situation prevails in which only a small part of the suspension liquid is able to interact immediately with the carbon dioxide bubbles. This part of the liquid is very quickly saturated by carbon dioxide resulting in slow dissolution of carbon dioxide, since the bubbles must be carried further in the suspension in order to encounter liquid not yet saturated by carbon dioxide.

As already briefly mentioned the slow mixing described above leads to uneven size distribution of the PCC crystals, since during the whole mixing period and until at least one of the chemicals has been fully consumed, existing PCC crystals grow and new crystals form. Moreover, in suitable flow conditions, PCC also precipitates on the walls of the flow channel, or the like, or on other fixed structures. This naturally is aided by the fact that the crystallization reaction is protracted, whereby far-away structures susceptible to crystallization become available.

In practice, these problems can be solved by trying to arrange a sufficiently short chemical mixing time, especially reaction time. In practice, this means, for instance, that when an optimally evenly dispersed PCC is desired, carbon dioxide is dissolved in the liquid or suspension flow, and only when the time needed for almost complete dissolution of carbon dioxide has expired, is lime milk mixed with the flow and fed in at least an almost stoichiometric amount relative to carbon dioxide. And, as in this case, lime milk is mixed as quickly and evenly as possible, the crystallization reaction gets to start and advance evenly through the whole liquid, whereby crystal growth is even and the reaction progresses quickly until completion.

French patent application FR-A1-2 821 094 describes an attempt to precipitate PCC in stock as vaterite crystals and focuses on solving the problem caused by unstable vaterite. In other words, it is known that vaterite is the most unstable crystal form of calcium carbonate, which tends to convert quickly to calcite and aragonite. Since the applicant of the document believes that the presence of vaterite in the final product provides the end product with especially good properties, a method was developed in which vaterite is formed at a sufficiently late stage for it to be sustained until the end product. The only way to ensure that the production of crystals occurs sufficiently late is to feed another source material for calcium carbonate at such a late stage that carbonate crystals form at the desired stage. In this case, the applicant decided to feed lime milk as close to the paper machine headbox as possible. The document uses the term "immediately before web formation" in many different contexts for when lime milk is fed. The penultimate sentence of the specification in the document states that lime milk is fed less than ten seconds before the point, when stock enters the web formation area of the papermaking machine. In other words, the carbonation reaction proceeds toward the end within ten seconds and the stock travels through the headbox to the paper machine wire section. The applicant therefore seems to believe that the precipitation or crystallization reactions may proceed without a problem in the piping of the paper machine headbox.

Studies that were made, however, have shown that such late lime milk feeding, using mixers for feeding lime milk available at the time of the patent document, in all probability is the cause of major runnability problems in a papermaking machine. The most obvious and serious of these appear as precipitation in the headbox pipes, which instantly harms web formation. The main reason for these runnability problems and precipitations is that for the most part, lime milk is mixed only with the stock due to the turbulence effect existing in the flow, with the result that the carbonation reaction continues at least in the papermaking machine headbox, and possibly also in the paper machine wire section. Thus, it should first be noted that the idea of using PCC as vaterite crystals, regardless of its good intention, will fail if it means that the crystallization reaction must proceed in the pipes of the paper machine headbox. Second, due to the great instability of the vaterite crystals, they cannot be produced in advance, because of their rapid conversion to more stable crystal forms.

Identifying the many problems related to the production of PCC discussed above requires a closer look at the kinetics of the crystallization reaction. If it is assumed that carbon dioxide is fed and at least the majority thereof also dissolved in the liquid or suspension/paper making stock, in which PCC is preferably to be precipitated, then the PCC crystallization or precipitation reaction will start at the time of mixing the lime milk. The time needed for the relevant mass transfer is influenced by, e.g., the following two factors: The faster and more efficiently lime milk is thoroughly mixed with the flow, the shorter the reaction time will be. Fast and efficient mixing in this step is intended to reduce as much as possible the differences of concentration in the flow. Another important factor is the lime-milk particle size, i.e., the smaller the lime-milk particle size is, the faster is the mass transfer of the relevant particles into the liquid phase, whereby the rate of the crystallization reaction obviously also increases. When the PCC starting materials are fine-grained and evenly dispersed in the liquid flow, crystallization occurs quickly and evenly through the whole liquid flow, eliminating the possibility of forming of oversized PCC crystals, agglomerates and precipitates. Experiments that were made have shown that a suitable lime-milk mixing time in terms of size distribution for producing PCC used in conventional paper production is roughly below 3 seconds. Furthermore, when the feed, mixing and reaction zone are arranged such that the PCC precipitation reaction ceases upon substantially completed conversion before the desired process step, e.g., the paper machine headbox, it is ensured that harmful precipitation or runnability problems will not occur in the relevant process step and the subsequent process.

The process according to the invention may also be implemented such that first lime milk, and only thereafter carbon dioxide, is mixed with a liquid or suspension (taking into account the influences of the pH value on darkening of the stock). Experiments that were made have shown that in a precipitation reaction carried out according to the method of the invention, in which carbon dioxide and lime milk were fed in whichever order, when trying to obtain optimal PCC crystal-size distribution, the time needed for the whole reaction, from the start of feeding the component participating in the reaction until practically all the lime milk has reacted with carbon dioxide and PCC crystals have formed, in other words, substantially a 100 percent conversion has taken place before a desired process step, e.g., the headbox of the fiber web machine, is below fifteen seconds, preferably below ten seconds, more preferably below 6 seconds, and most preferably below 3 seconds. The shorter the reaction time sought for, the quicker the mass transfer needs to be. Quick mass transfer is only obtained by arranging the feed of the latter chemical such that in practice the chemical is mixed almost completely, immediately when the feed occurs. It is, naturally, assumed that the previously fed chemical has already been dispersed, or even dissolved evenly through the whole liquid or suspension/paper making stock. Another important factor in aiming for a short conversion time is, as previously mentioned, a sufficiently fine bubble or particle size, i.e. a large specific surface area of the chemicals in the reaction zone. The smaller the bubble or particle size (the greater the specific surface area) is, the quicker the mass transfer from the gas or solid material to the liquid occurs. The preferred average particle size of the relevant lime milk was found to be below 3 microns ($\mu m$), preferably below 1.5 microns, and most preferably below 0.5 microns. As for the bubble size of carbon dioxide, it should be at least below 10 mm, and more preferably below 100 microns. Naturally, the optimal result is obtained if carbon dioxide, when fed along with the liquid flow, is already dissolved completely in the feed/injection liquid.

In theory and under certain preconditions, useful mixing methods comprise static mixers, dynamic (rotating) mixers and injection mixers. Static mixers are suited for situations, in which all conditions are optimal. In other words, the liquid flows to be mixed are astatic and their flow velocities are not too far apart from each other. Moreover, the mixer has to be specifically designed for the purpose of rapid mixing. A particular problem may be the flow resistance caused by large-sized mixers, the high cost of producing a mixer, or the suitability of mixers for very few applications given their costs of development.

Dynamic mixers are also possible, especially when relatively small flows should be mixed with one another. Relative differences in the flow velocities of liquids to be mixed can be large, when the mixing volume is kept relative small. In large-sized devices, which often comprise, e.g., the piping of a papermaking machine headbox, the investment and installation costs of a rotating mixer and the consumption of energy are factors restricting their use.

Based on tests that were made, the most advantageous mixing method related to the application purpose of the invention turned out to be an injection mixer.

TrumpJet®, a feed device known from prior art and developed by Wetend Technologies Oy, is discussed in patents such as EP-B1-1064427, EP-B1-1219344, FI-B-111868, FI-B-115148 and FI-B-116473. The feed device was developed, due to the fact that only rotating and static mixers for mixing retention agents and similar chemicals in the production of paper were known in prior art. The devices were expensive investments in every aspect and relatively ineffective in situations, where even mixing of the chemical with the headbox stock is expected, which prompted the development of, e.g., an injection mixer according to the invention allowing for even and quick mixing of chemicals in a highly user-friendly device. Thus far, the functional quality of such a device has been measured by the resulting product, i.e., in most cases paper, as well as the amount of chemicals used. In other words, when the resulting paper quality remained unchanged or improved while the amount of chemical utilized declined, it has been inferred that chemical mixing had improved when compared with the use of prior-art devices.

However, the injection mixer is now assumed to implement a new kind of application purpose, where we are dealing with not only mixing a single chemical with the paper making stock such that it disperses evenly therein, when carried through the papermaking machine headbox to the wire, but with mixing two chemicals with the paper making stock, such that the reaction among the chemicals occurs upstream of the headbox or some other process step.

Thus, an object of the present invention is to arrange such a short mixing time for the chemical and the mixing itself so even throughout the whole liquid flow that the size distribution of the resulting PCC crystals is as homogeneous as possible and the risk of forming of oversized crystals, agglomerates and precipitates as little as possible.

A more specific object of the present invention is the injection of lime milk and/or carbon dioxide with the liquid or suspension flow such that the mixing into the flow occurs quickly and evenly, in practice independently the own turbulence of the flow.

Figure 20:
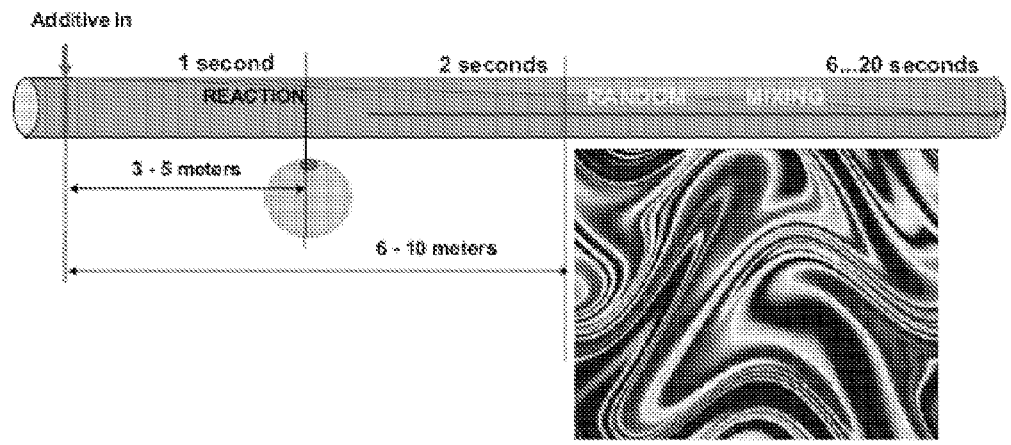
Figure 21:
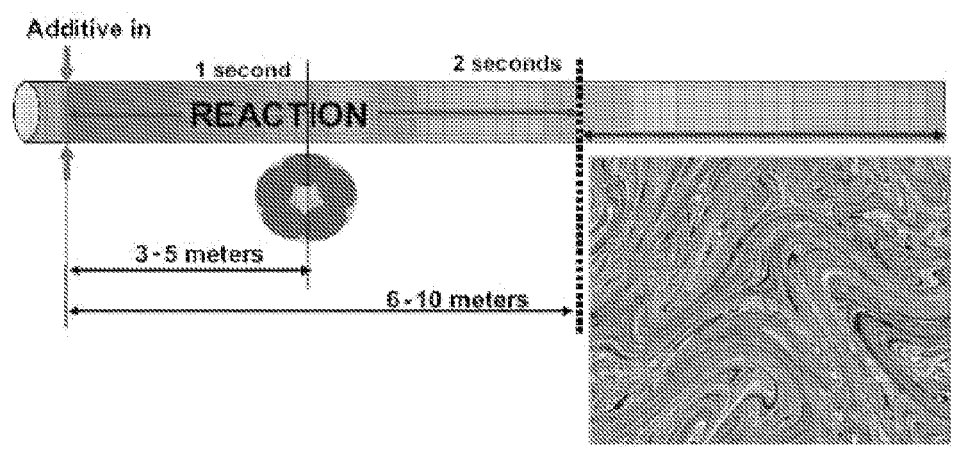

When injecting carbon dioxide and/or lime milk into the flow, preferably the TrumpJet® feed device developed by Wetend Technologies Oy and already described above is used, so that a desired number of them may be placed on the flow pipe circumference. When one or more feed or injection devices are placed on the circumference of the flow pipe, depending on the size and shape of the pipe, we are actually dealing with an injection unit covering all the injection devices placed on the same circumference of the pipe in order to feed the same chemical. FIGS. 19, 20 and 21 show results of the test, in which the operation of a feed device according to the prior art and the TrumpJet® feed unit is compared, when a chemical is fed into the liquid flow.

The feed device according to the prior art is a pipe fitting arranged on the flow pipe circumference, from which a chemical to be mixed is allowed to flow along with the liquid flowing in the pipe. It can be seen from the figures that the TrumpJet® feed unit is capable of the quick mixing set as one condition of the invention above. By using the TrumpJet® feed device, injection and mixing may be performed at a distance of about 1-3, preferably about 1.7-2 seconds (calculated in meters, less than ten meters) from the subsequent process step or device, while when using a prior art device the feeding the additive is to be done several tens of meters before the desired process step or device, e.g., the papermaking machine headbox, so that the chemical has time to be mixed under the influence of the flow turbulence before the process device. The above applies to situations, in which the chemical or the like should be evenly distributed before the following process step. If, however, we are dealing with a situation, in which the chemical must react with some other chemical or a substance already present in the liquid flow, the time required by the respective reaction must naturally be reserved for, unless it is preferred to allow the respective reaction to continue in the above-mentioned process step, e.g., the papermaking machine headbox.

Another object of the present invention is to control the PCC crystallization in the flow solid, whereby both the size and distribution of the carbonation crystals in the suspension may be determined beforehand in a relatively accurate fashion. An essential way of realizing this object consists in injecting the PCC starting materials in the liquid flow such that their crystal and/or bubble size is suitable for the purpose.

An object of the present invention is to precipitate PCC crystals on the surface of the fibers in the flow.

A special object of the present invention is to precipitate PCC crystals in the hollow core, the so-called lumen of the fibers present in the flow.

In order to realize at least one of the above-mentioned objects and to accelerate the PCC precipitation reaction the present invention discloses the addition of at least one of the chemicals: lime milk and carbon dioxide, in a bubble or particle size sufficiently fine, in a fluid flowing in a pipe such that, in practice, simultaneously with the addition of a chemical, it becomes substantially evenly mixed over the whole cross-section area of the flow. Here, the injection should occur substantially in transversal direction relative to the liquid flow, and with a velocity at least three times (preferably 5-10 times) that of the liquid flow.

In our opinion, this type of mixing is especially important for carbon dioxide particularly when it is the latter of chemicals to be mixed, which the prior-art methods have not been capable of mixing in the liquid or the fiber suspension so well that the carbon dioxide would have dissolved quickly in the water, in practice immediately, which is a requirement for in-line PCC production to succeed on a paper-mill scale. When carbon dioxide already in its addition step is distributed over the whole cross-section area of the flow, and carbon dioxide is not able to form at any point of the flow densification, in which the liquid surrounding the bubble would be saturated by carbon dioxide and the dissolution of carbon dioxide prevented, but instead carbon dioxide becomes dissolved immediately after injection.

When, according to an especially advantageous embodiment of the invention, also lime milk is fed and mixed over the whole cross-section area of the pipe flow, a situation ensues, in which the lime milk mass transfer occurs quickly, whereby calcium ions are in fact evenly distributed through the whole liquid/suspension. Thus, their reaction with the carbonate ions resulting from the dissolving of carbon dioxide is actually able to start simultaneously through the whole liquid volume, in which also the originally present solid may also be assumed to be evenly distributed. In other words, the fiber flow will be treated homogenously and evenly. The result is that the crystal size and calcium carbonate distribution remain even and crystals are situated evenly in the suspension solids. If mixing is uneven and lime milk reacts strongly locally, uncontrolled PCC crystal growth occurs, which may lead to oversized crystals and PCC agglomeration, among other things, and cause serious quality and process runnability disturbances. This may also cause PCC to crystallize uncontrollably on the walls of the process devices and piping causing overwhelming cleaning and process runnability problems. Similarly, process controllability and adjustment is affected, and predicting the quality of the produced PCC becomes more difficult.

At least some of the weaknesses of the PCC production process according to the above described prior art may be remedied and at least some of the above-mentioned objects may be realized by a method according to the invention for crystallizing a filler, especially calcium carbonate, in a paper machine short circulation so as to form crystals in a flowing solid and/or on its surfaces by feeding carbon dioxide and lime milk into a short circulation liquid flow and allowing them to react with one another, whereby the method is characterized in that at least either carbon dioxide or lime milk is fed and mixed into the liquid flow as sufficiently small-sized particles or bubbles such that the chemical is spread substantially evenly in the liquid flow, regardless of the flow conditions of the liquid flow, and such that the crystallization reaction is substantially completed in less than fifteen seconds, preferably less than ten, more preferably less than six, and most preferably less than three seconds, thereby realizing a size distribution of the homogenous calcium carbonate crystals suited for the purpose, preventing the formation of oversized PCC crystals, PCC agglomeration and PCC precipitation, and controlling the carbon dioxide and lime milk carbonation reaction.

In quite the same way, at least some of the weaknesses of the above-described PCC production process according to the prior art may be remedied, and at least some of the above-mentioned objects may be realized by an approach system of a fiber web machine according to the invention, comprising at least devices for receiving filtrate from the fiber web machine, devices for producing paper making stock at least from the filtrate obtained from the fiber web machine and various fiber and filler components, as well as flow piping, along with pumping device(s), consisting of a plurality of flow pipes for carrying paper making stock from its production to the headbox of the fiber web machine, which approach system is provided with devices for feeding both carbon dioxide and lime milk into a liquid flow moving inside flow piping, whereby the approach system is characterized in being provided with a first injection unit arranged on the wall of the flow pipe for injection of at least either lime milk or carbon dioxide into the flow pipe, substantially transversally relative to flow direction of the liquid flow.

Other characteristic features of the method according to the invention and the approach system of the fiber web machine appear in the attached claims.

Figure 2:
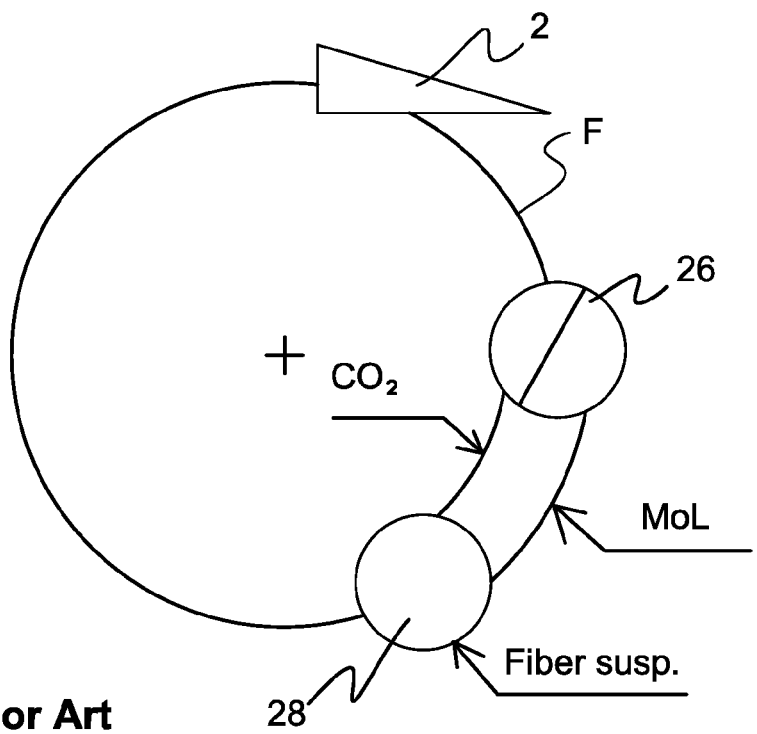
Figure 3:
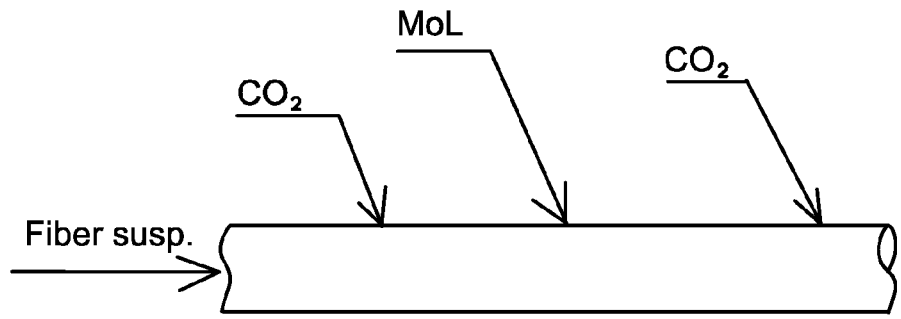
Figure 4:
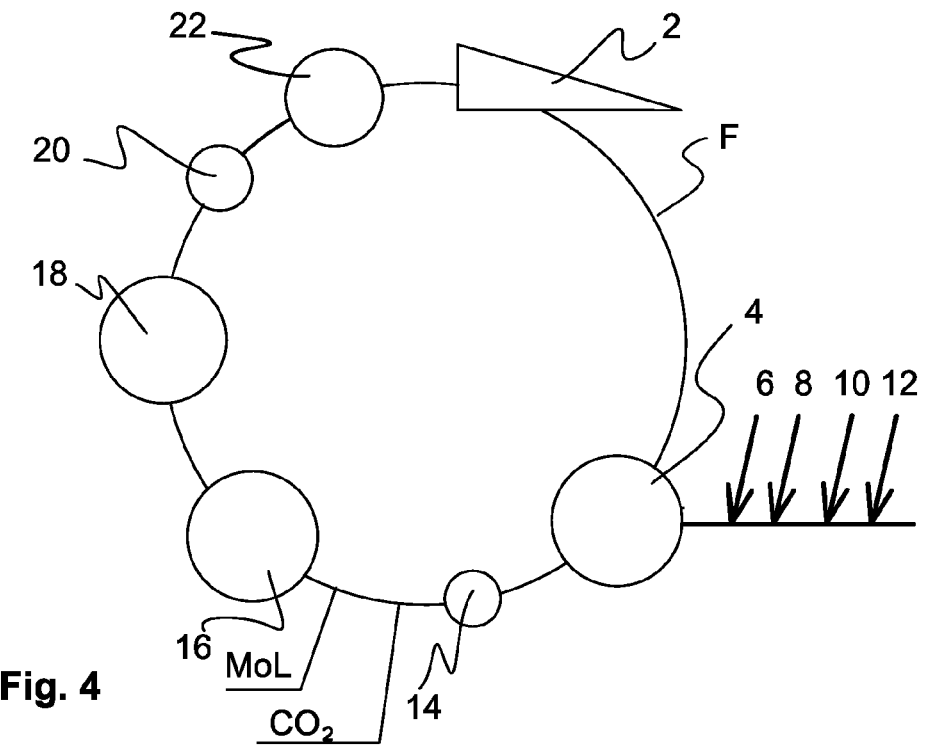
Figure 5:
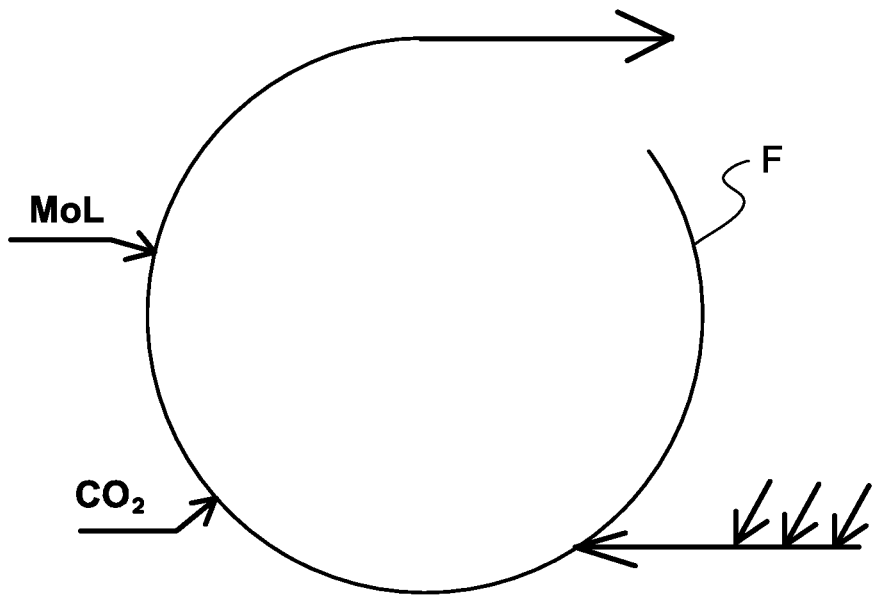
Figure 6:
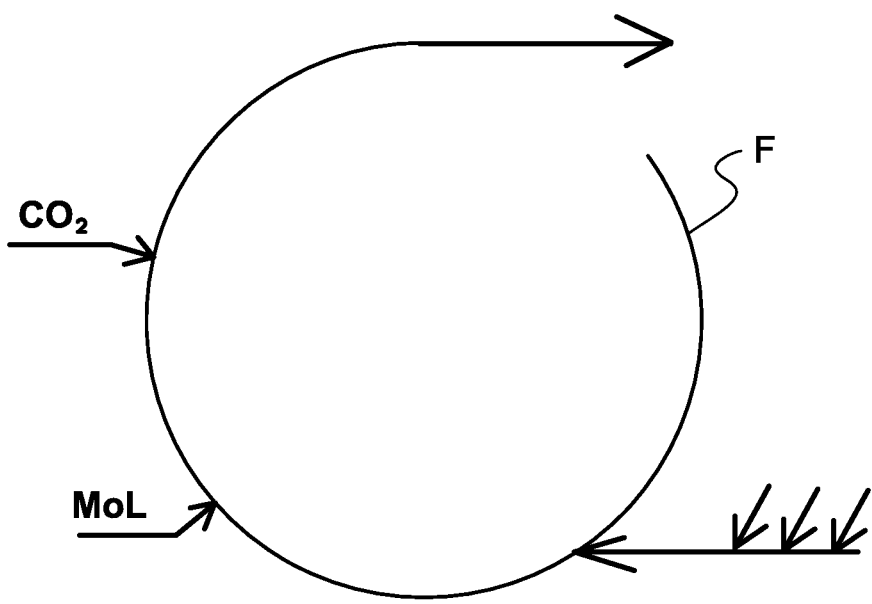
Figure 7:
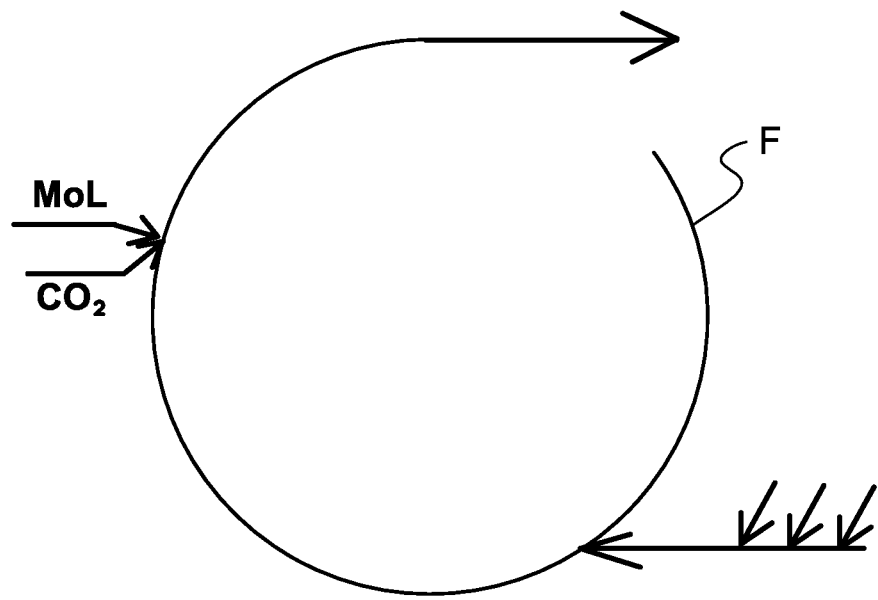
Figure 8:
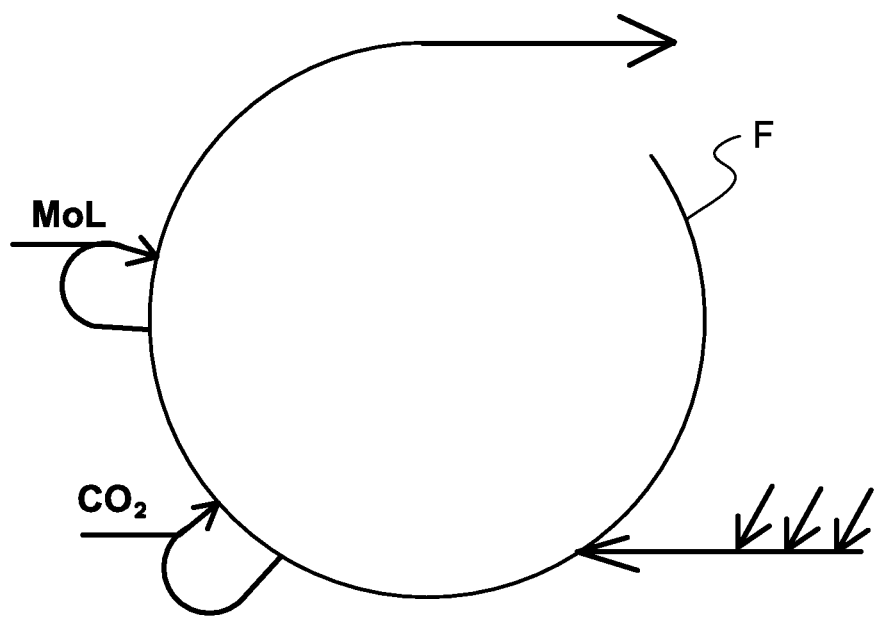
Figure 9:
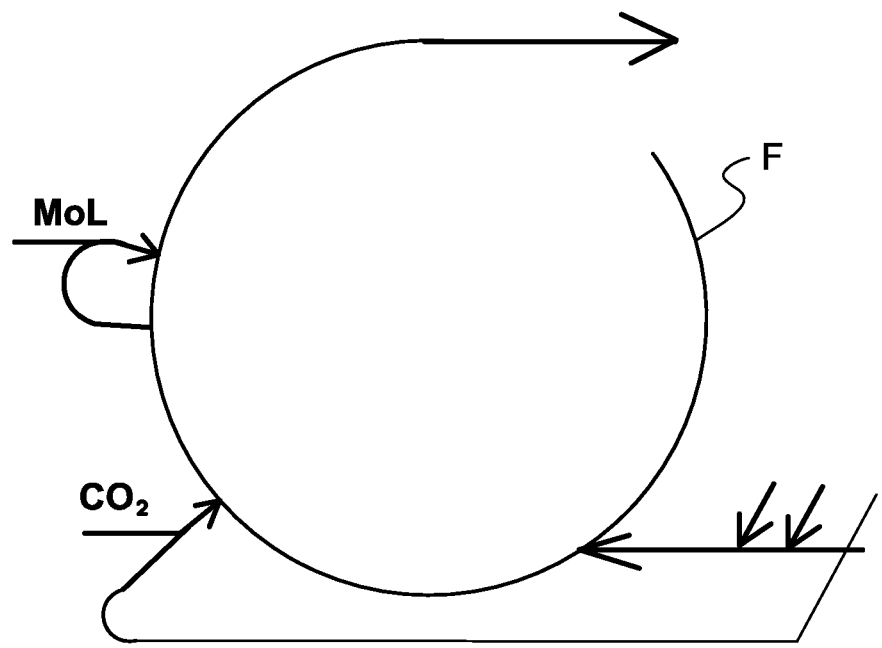
Figure 10:
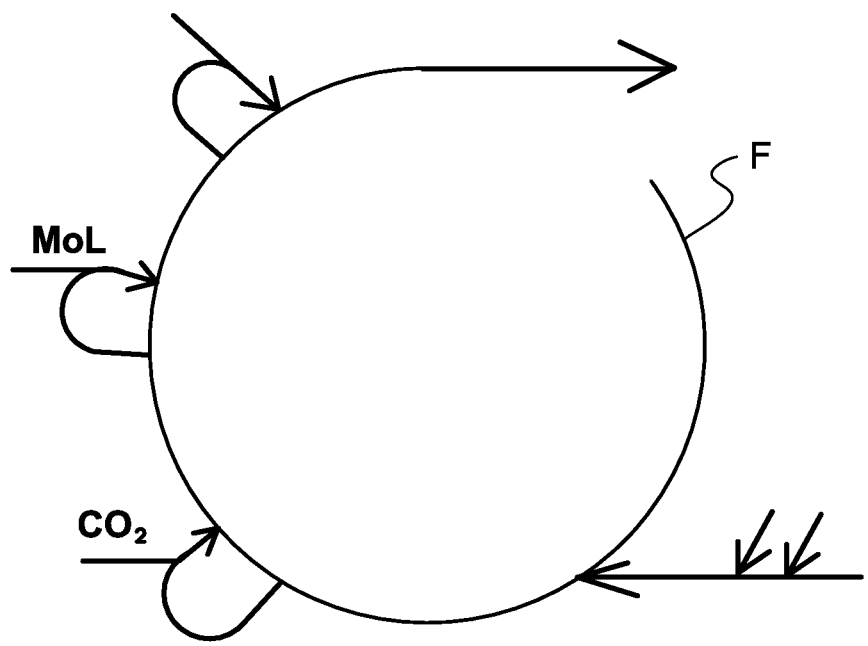
Figure 11:
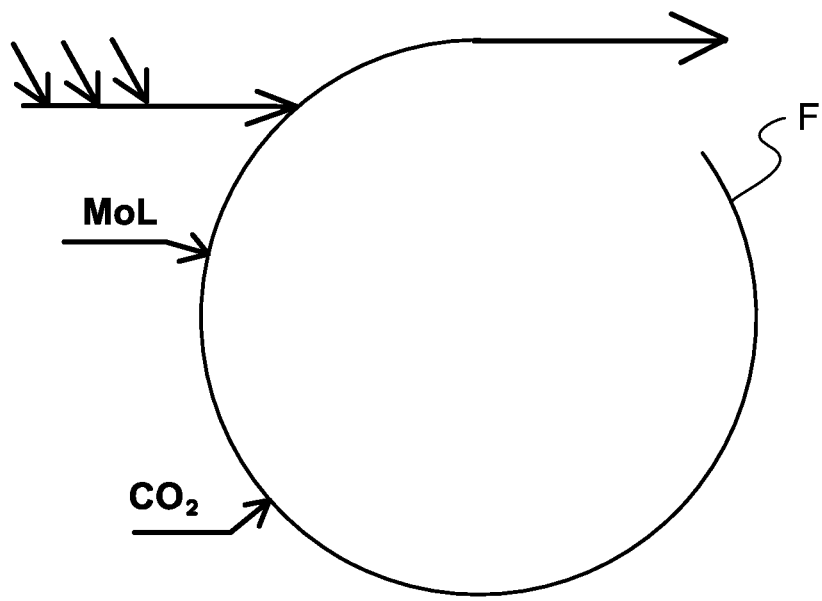
Figure 12:
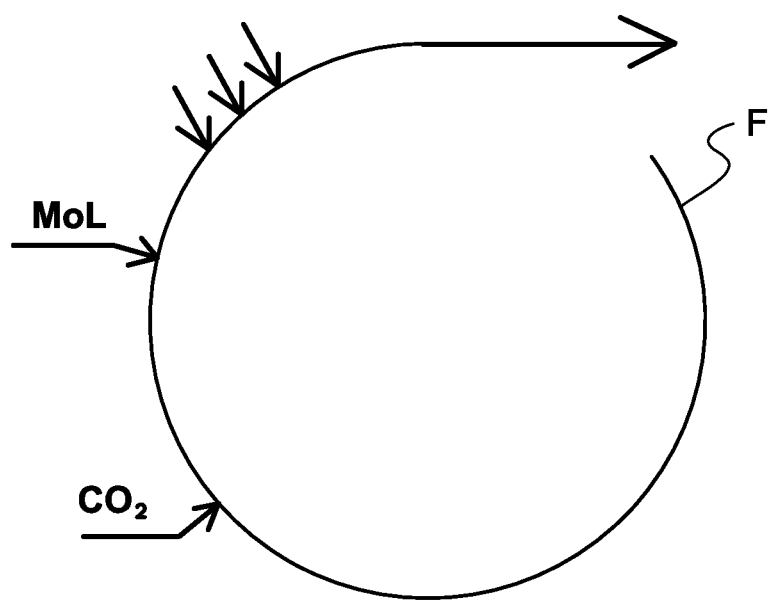
Figure 13:
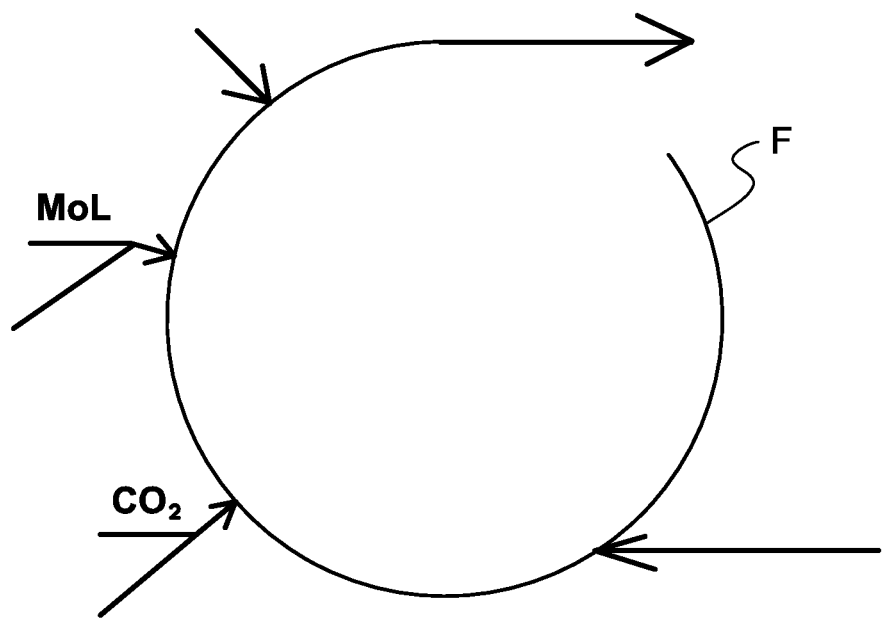
Figure 14:
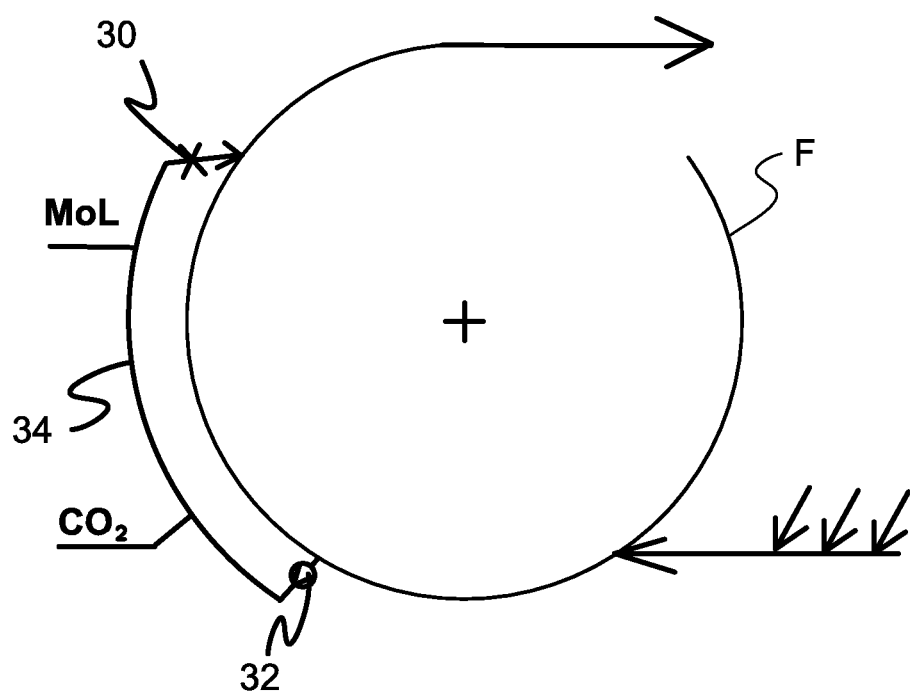
Figure 15:
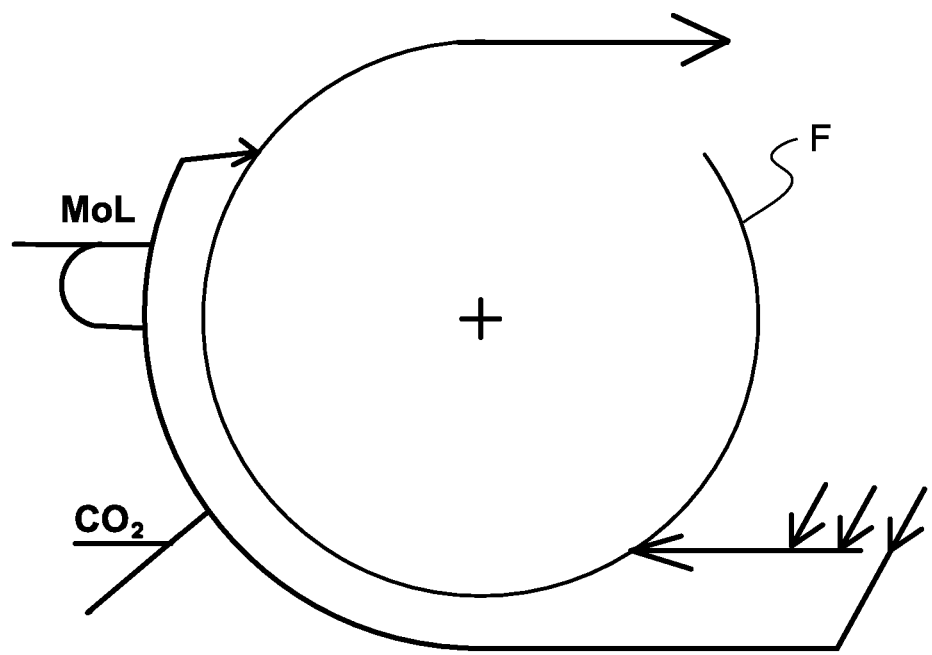
Figure 16:
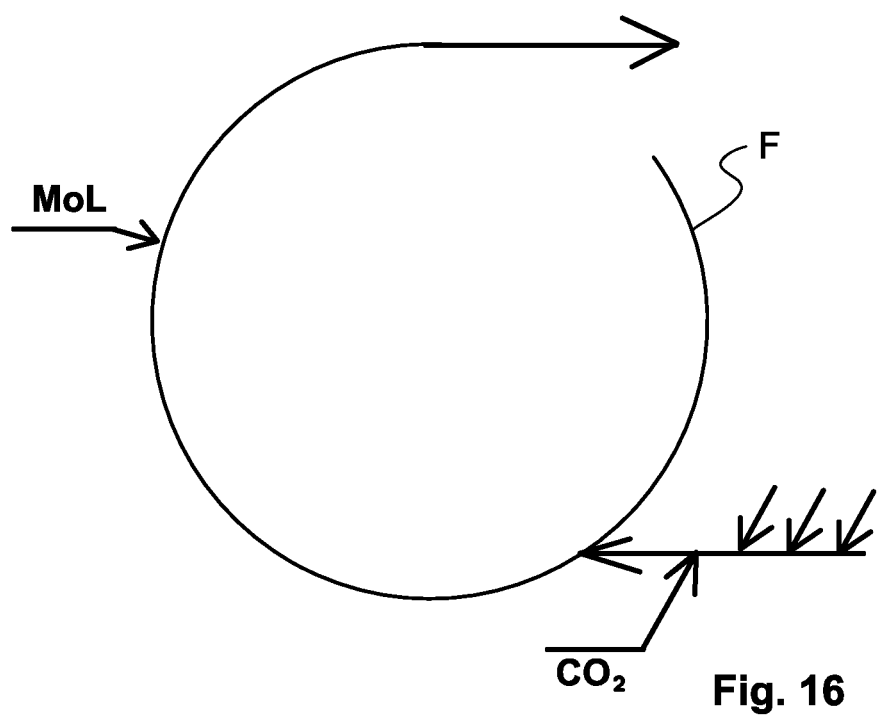
Figure 17:
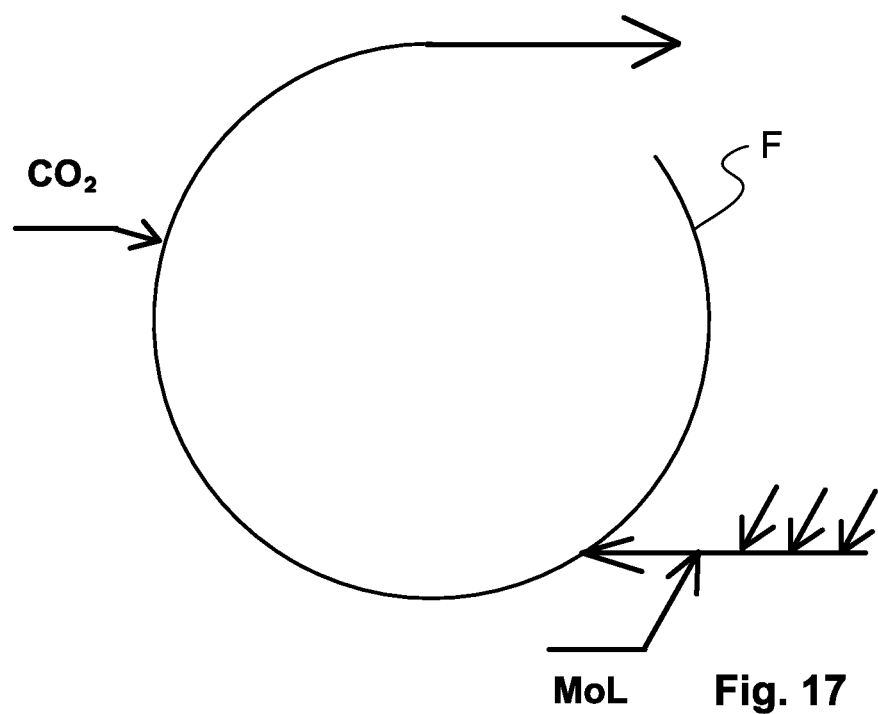
Figure 22:
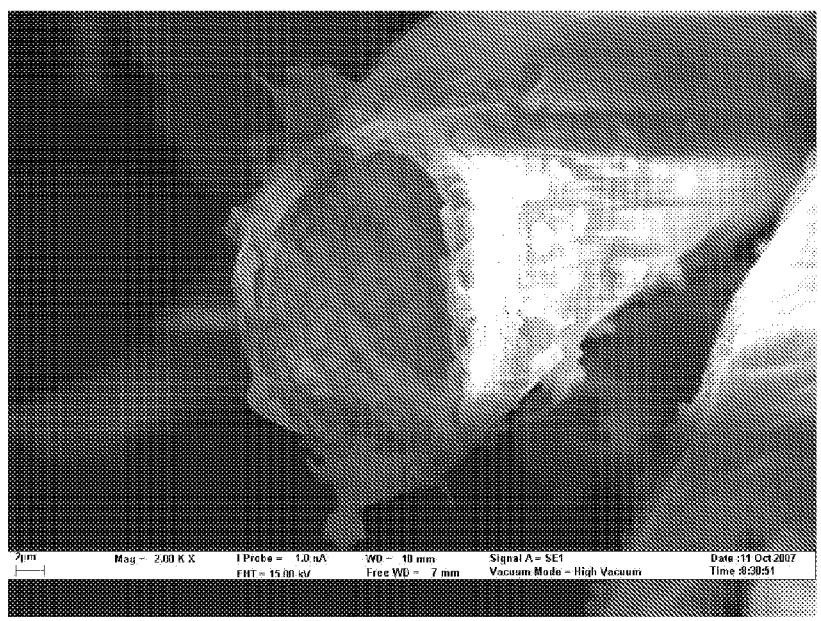
Figure 23:
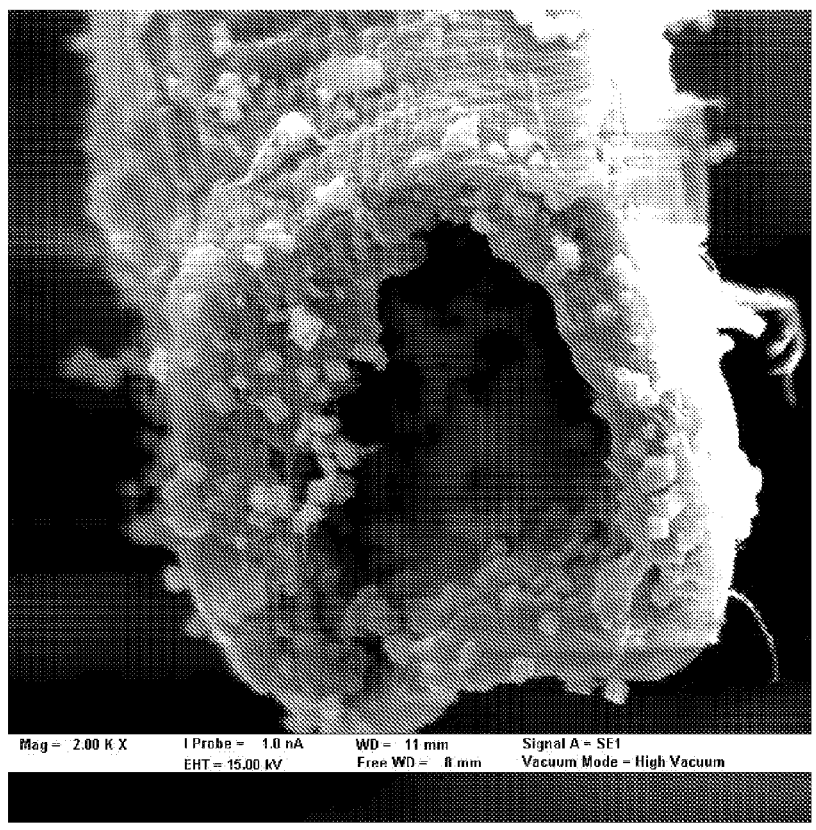

Advantages obtained by the method and the approach system of the fiber web machine according to the invention over the prior-art methods are for example:
  PCC precipitation directly into the suspension flowing in
    the short circulation of the fiber web machine Rapid dissolution of carbon dioxide so that the PCC production process may be connected immediately in the paper machine short circulation Quick mixing of lime milk in the suspension, quick mass transfer from solid to liquid phase Rapid carbon dioxide and lime milk reactions Even mixing of the chemicals through the whole flow meaning even and controlled formation of carbonate crystals and even adherence of crystals to the fibers and solid A simplified short-circulation process—no need at all for a thick stock mixing tank or restriction to use a smaller-sized tank Reduction of the investments required by PCC production by at least half compared with previously used devices Reduction of the PCC production energy costs to about a tenth when compared with the previous PCC production The consumption of clean water is substantially reduced, when compared with on-site PCC devices according to prior art Paper production requires less or no retention chemicals Paper production may use more fillers than previously, thereby saving on the use of expensive fiber material The need for hydrophobic glue is reduced The papermaking water cycles become cleaner and/or the need for purification chemicals is reduced, and water cycles may be closed more than previously The invention is described below in more detail in reference to the attached figures, where FIG. 1 shows schematically a short circulation process arrangement of a papermaking machine, FIG. 2 shows schematically a PCC production method according to prior art in the short circulation of a papermaking machine, FIG. 3 shows schematically a second PCC production method according to prior art in the short circulation of a papermaking machine, FIG. 4 shows schematically a short circulation process arrangement according to a preferred embodiment of the present invention, FIG. 5 shows more generally the short circulation process arrangement of FIG. 4 according to a preferred embodiment of the present invention, FIG. 6 shows schematically a short circulation process arrangement according to a second preferred embodiment of the present invention, FIG. 7 shows schematically a short circulation process arrangement according to a third preferred embodiment of the present invention, FIG. 8 shows schematically a short circulation process arrangement according to a fourth preferred embodiment of the present invention, FIG. 9 shows schematically a short circulation process arrangement according to a fifth preferred embodiment of the present invention, FIG. 10 shows schematically a short circulation process arrangement according to a sixth preferred embodiment of the present invention, FIG. 11 shows schematically a short circulation process arrangement according to a seventh preferred embodiment of the present invention, FIG. 12 shows schematically a short circulation process arrangement according to an eighth preferred embodiment of the present invention, FIG. 13 shows schematically a short circulation process arrangement according to a ninth preferred embodiment of the present invention, FIG. 14 shows schematically a short circulation process arrangement according to a tenth preferred embodiment of the present invention, FIG. 15 shows schematically a short circulation process arrangement according to an eleventh preferred embodiment of the present invention, FIG. 16 shows schematically a short circulation process arrangement according to a twelfth preferred embodiment of the present invention, FIG. 17 shows schematically a short circulation process arrangement according to a thirteenth preferred embodiment of the present invention, FIG. 18 shows schematically a structural alternative of a preferably used injection device in process arrangements according to the invention, FIGS. 19a-19d show an injection device according to FIG. 18 using a mixing profile generated as a function of time, FIG. 20 shows the operation of a chemical feed device according to prior art, FIG. 21 shows the operation of a preferably used injection device in a process arrangement according to the invention, FIGS. 22 and 23 show a process arrangement according to the invention using PCC crystals precipitated on fiber surfaces.

It should be noted that for the sake of simplicity the section related to the above invention and especially the following more detailed explanation of the invention use relatively general terms, whose explanations are provided below.

A papermaking machine refers more broadly to a fiber web machine, or all web-production machines, in which a web-like product is produced from a fiber-containing suspension. This therefore includes besides various end products, also all possible intermediate products.

Stock refers to any suspension flowing toward the headbox of a fiber web machine, the web being formed from this suspension at some point by a fiber web machine. Stock comprises all the above-mentioned suspension types containing fiber even to a minor extent.

A liquid flow refers to all flows, regardless of consistency, moving in a short circulation of the fiber web machine, thus the liquid flow may contain more or less fiber and/or various paper production additives or fillers. A liquid flow also contains various gas-containing suspensions and filtrates, so-called bright and super-bright filtrates, and both thick fiber components and pigment-containing precipitants. The term "liquid flow" includes also secondary and partial flows, such as feed, accept and reject flows for screening and vortex cleaning, moving in various parts of a short circulation.

A fiber suspension used to produce a fiber web refers to any suspension containing even a small amount of fiber. Thus, all the various suspensions between the filtrate obtained from the wire section of a fiber web machine and the final paper making stock fed to the headbox, and including these, are suspensions to be used in the fiber web production.

A processed filtrate component refers to any processing result, including a precipitant a bright filtrate, a turbid filtrate, a dilute filtrate containing mostly solids, or a precipitated filtrate containing solids.

A fiber component refers to any fiber-containing component used for producing a fiber web of any consistency. Thus, a fiber component may be mechanical pulp, chemical pulp, chemi-mechanical pulp, recycled pulp, various fiber-containing precipitants obtained from a filtrate, and the like.

Injection refers to the feeding of a flowing medium to a liquid flow using the injection liquid such that the medium to be injected has a substantially higher flow velocity than the liquid, whereby the medium, when injected, penetrates deep into the liquid flow and spreads there substantially evenly (so-called peak-to-peak dispersion below 15%—calculating the peak-to-peak dispersion as the difference of the deviating extreme values relative to their average). Preferably, the injection feed velocity is around 3-15, preferably 5-10 times the liquid flow velocity.

FIG. 1, discussing schematically a process arrangement of a short-circulation of a prior-art papermaking machine, illustrates by reference number 2 the paper machine, where so-called white water F is obtained as the filtrate, which is carried either directly or via treatment in intermediate tank(s) to a mixing tank, filtrate tank or wire pit 4, to which various fiber components needed in stock preparation and additives needed in paper production are introduced. From fittings 6-12, at least one of the following is carried to a mixing tank or similar arrangement: chemical virgin pulp, mechanical virgin pulp, long and/or short-fiber pulp, recycled fibers and coated rejects, uncoated rejects, a fiber fraction obtained from a recovery filter, as well as fillers and/or additives that may be mixed already in this step with the paper making stock. The consistency of the fiber components is something between three and five percent, depending on the application. Paper making stock in the mixing tank 4 is mixed of its above-mentioned components to the desired composition and the consistency of the outgoing paper making stock is adjusted within the 0.3-1.5% range, either in a separate mixing tank alone, or in a wire pit connected thereto, or the like, to match the production of paper or more broadly speaking, the fiber web. Following the mixing tank 4, or generally speaking final dilution, the paper making stock is conveyed by a pump, a so-called mixing pump 14, to vortex cleaning in a vortex cleaning plant 16, where heavier particles are separated from the paper making stock. Typically, the rejects of the first step of the vortex cleaning plant are further processed in many vortex cleaning plant steps, and in most cases, the accept obtained from each of these is conveyed to the feed of a previous step and the reject in to the feed of a following step, until the reject of the last step is removed from the short circulation. The accept of vortex cleaning plant 16 continues its travel to a gas separation tank 18, where air, or possibly other gas, is removed from the paper making stock by vacuum so that it will not disturb the paper production. The level in the gas separation tank 18 is kept constant by means of a special weir, whereby part of paper making stock fed to the tank is returned back to the tank feed. Paper making stock flows from the gas separation tank 18 to a feed pump 20 of the headbox, which pumps the paper making stock to a so-called headbox screen 22, where large-sized particles unsuited for paper production are separated from the paper making stock and whose accept fraction is carried to papermaking machine 2 through its headbox. The reject of headbox screen 22 is processed for recovering the acceptable fiber fraction in yet another screening step, whose accept is usually returned to the feed of the headbox screen. The short circulation of fiber web machines producing a less demanding end product may not have a vortex cleaning plant, gas separation and/or headbox screen.

FIG. 2 is a schematic depiction of a process according to prior art and, discussed in e.g., patent document U.S. Pat. No. 6,387,212 B1 for the production of PCC in connection with the short circulation of a papermaking machine. The filtrate F obtained from the papermaking machine is in this process divided by filtering 26 into two fractions, of which the bright filtrate is mixed with lime milk (Ca(OH)$_2$, Milk of Lime, hereafter MoL) and the solids-containing filtrate with carbon dioxide ($CO_2$). Since the solids-containing filtrate contains calcium carbonate, carbon dioxide is formed there when feeding calcium bicarbonate. Finally, both the above-mentioned fractions and the fiber suspension are fed to a reactor 28, in which calcium bicarbonate reacts with calcium hydroxide in order to form calcium carbonate. The reaction is said to occur in a consistency of 1-15, preferably 5-10 percent.

FIG. 3 is a schematic depiction of a second prior art proposal for PCC production in the approach system of a paper making machine. This process, which is dealt with in, e.g., patent document U.S. Pat. No. 5,679,220, is based on a papermaking stock component or their combination, with which lime milk and carbon dioxide are mixed. The mixing may be done either in a reactor designed especially for this purpose or in a pipe flow. The document explains how the point of the carbon dioxide introduction may vary relative to the lime-milk feed, making it possible, for example, to feed carbon dioxide before, as well as after the feeding of the lime milk. Although the calcium hydroxide (lime milk) conversion reaction to calcium carbonate is said to be fast, this document, nevertheless, considered it necessary to provide a special reaction zone following mixing, in order to ensure full conversion of alkaline hydroxide to carbonate. This is very important, because if the pH is too high, darkening may occur, especially of the mechanical pulp. For this reaction zone, a time period of one to two minutes is given. The above reaction time, however, in a practical paper machine process is problematically long, when keeping in mind, for example, that the paper making stock flow velocity in the approach piping of the papermaking machine is about 5 m/s. In practice, the pipe flow available for mixing in the paper machine short circulation is at best only some tens of meters, i.e. a tenth or less of what is proposed in the US document.

When starting to examine the reasons why the conversion reaction, which in theory should be relatively fast, is so slow, the initial suspicion falls on the manner in which the chemicals are mixed. In our view, clearly the biggest factor involved is the way in which carbon dioxide and lime milk is mixed, as described in the document. The document specifically mentions that carbon dioxide is allowed to discharge into a pipe mixer such that the fiber suspension flowing in the pipe sweeps along the carbon dioxide entering the pipe, and the pipe flow, itself, mixes carbon dioxide with paper making stock as small gas bubbles. When in the test equipment of this US document, in which the diameter of the flow pipe is anywhere from a half inch to six inches, a mixing/reaction time of about one to two minutes is needed, it can only be guessed, how much time is needed, if the diameter of the flow pipe is clearly greater, whereby the flow is relatively more laminar. The diameter of the pipeline carrying the paper making stock to the papermaking machine headbox is, e.g., in the 500-1000 mm range, i.e., in reality the cross-sectional area is at least ten (possibly even hundred or thousand) times greater, when compared with the testing equipment of the U.S. Pat. No. 5,679,220 document. In our view, in the prior-art mixing methods, carbon dioxide is carried along with the flow such that after the point of adding carbon dioxide, a uniform gas wake is initially formed, which slowly breaks into gas bubbles, which further burst into smaller bubbles. However, the end result is a situation in which only a small part of the suspension liquid can interact immediately with the carbon dioxide bubbles and be quickly saturated with carbon dioxide. Consequently, dissolution of carbon dioxide occurs slowly, since the bubbles must be carried further in the suspension in order to encounter liquid not yet saturated by carbon dioxide. Another factor affecting mixing is the consistency of the fiber suspension, since clearly a higher suspension consistency involves a slower moving swirling turbulence. Even, e.g., US document itself states that a consistency above five percent delays the gas-liquid reaction. The consistency used in the examples of this document was 1.5%. The reactions of lime milk and carbon dioxide stemming from such an uncontrolled and weak mixing may cause, e.g., oversized PCC crystals, PCC agglomeration and PCC precipitation, which adhere to the flow channel or other walls, thereby causing deposits and subsequent problems with contamination. The fact, that when a large lime milk droplet reacts with carbon dioxide, a particle having on its surface PCC is formed, the particle having inside unreacted lime milk, may also constitute a problem. At some stage, lime milk is able to gush out from this particle, raising the pH of the suspension. When this occurs, while sufficiently many PCC particles burst, the increased pH mixes the system.

FIG. 4 shows a PCC production process according to a preferred embodiment of the invention combined in the same way as schematically shown in FIG. 1 to the short circulation of a papermaking machine. In the method according to FIG. 4, PCC production occurs in the paper machine short circulation before the vortex cleaning plant 16. In practice, carbon dioxide is injected at the pressure side of pump 14, and calcium hydroxide ($Ca(OH)_2$; lime milk), after the carbon dioxide has dissolved a few meters from the former, in the same pipe i.e. in the feed pipe of the first stage of the vortex cleaning plant 16. When ensuring that a second injection feed unit i.e. the lime-milk injection unit, is at a sufficient distance (this depends on, e.g., the lime milk particle size and the injection feed velocity) from the vortex cleaning plant 16, the crystallization reaction will have time to be completed before vortex cleaning. One advantage of this embodiment is that the vortex cleaning 16 and, the machine screen 22 later on in the short circulation remove any oversized particles, whereas any excess gaseous $CO_2$ is removed in gas separator 18. It is possible to perform subsequent acidification, if the pH value needs to be adjusted, e.g., at the suction side of the headbox feed pump 20. In other words, the chemicals are injected in the paper making stock flow going to the papermaking machine, where all fiber components have been already added and whose consistency substantially matches the headbox consistency.

FIG. 5 shows in principle a PCC production process similar to the previous one, but a bit more schematically. In other words, starting with FIG. 5, a representation is used, in which no consideration is given to which device there are present in the paper machine short circulation, instead it merely focuses on in which order, into which liquid/suspension the chemicals are mixed and in which way this is done. Performed experiments have shown that the point of the short circulation at which PCC is precipitated in fibers, is not as important as the way in which the precipitation occurs, and particularly how the chemicals are mixed into the suspension. Furthermore, it was also shown that particle or bubble size has a significant effect on both the PCC production rate and the quality of produced PCC, particularly on the size and size distribution of the particles to be formed. In other words, FIG. 5 shows only that so-called thick stock consisting of different stock fractions i.e. stock components is mixed with the filtrate F obtained from the papermaking machine, whereupon carbon dioxide and thereafter lime milk are mixed into the fiber suspension. At this stage, however, it is worth noting that a characteristic feature of most of the embodiments of our invention is that it is advantageous, in our opinion, to dissolve carbon dioxide in the available liquid before injecting lime milk. At least two reasons exist for this. First, if thick stock contains mechanical pulp or recycled pulp, consisting in part of mechanical pulp, injecting lime milk before carbon dioxide may cause the pH value of the suspension to increase such that mechanical pulp starts to darken. To prevent this from happening, it is safe to first inject carbon dioxide, whereby the suspension pH falls and darkening will not occur. Second, the precipitation reaction occurs quickly, if carbon dioxide is already dissolved in the liquid. Another advantage is obtained by carbon dioxide being evenly dissolved in the whole liquid. Thus, when lime milk is injected preferably such that it spreads quickly and evenly in the mixture through the whole suspension, evenly distributed calcium carbonate, PCC, forms on all the surfaces of fibers and solids present in the suspension.

FIG. 6 shows schematically a second method of producing PCC in the short circulation of a papermaking machine according to a second preferred embodiment of the invention. In fact, the only feature differing from the previous embodiment is the order of the carbon dioxide and lime milk injection. Such an injection system, in which lime milk is injected first and only later carbon dioxide, may be relevant in our opinion under some conditions. First, when there is not a significant amount of mechanical pulp either as virgin pulp or recycled pulp in the fiber suspension, or when the amount of lime milk to be fed is so small that the pH value is not raised to a level entailing the risk of darkening. Second, it is our understanding that the injection of carbon dioxide or rather its mixing into the paper making stock must be especially effective in this embodiment, so that dissolution occurs quickly and carbon dioxide can be distributed evenly through the whole suspension, whereby the reaction with the lime milk results in a homogenous PCC formation. The practical reality, however, is that the reaction only advances via the ions and thus PCC will only form gradually as carbon dioxide dissolves.

FIG. 7 shows a third method of producing PCC in the short circulation of a papermaking machine according to a third preferred embodiment of the invention. Thick stock formed from different fiber components according to the figure is diluted in proper consistency by a filtrate obtained from the papermaking machine, whereupon lime milk and carbon dioxide are injected into a fiber suspension substantially simultaneously. The injection may be done by using a separate injection liquid, whereby carbon dioxide dissolved in water may be used as injection liquid for lime milk or, e.g., both chemicals may be injected by using a secondary stock flow obtained from a main paper making stock pipe, or by using some other liquid flow of the short circulation as feed liquid. The injection may be performed either by nozzles common to both chemicals, or by individual nozzles for each chemical placed alternatingly on the circumference of the flow pipe. p FIG. 8 shows a method of producing PCC in the short circulation of a papermaking machine according to a fourth preferred embodiment of the invention. Thick paper making stock formed from different fiber components according to the figure is diluted to a suitable consistency by a filtrate obtained from the papermaking machine, whereupon lime milk and carbon dioxide are injected into the paper making stock substantially simultaneously. In fact, the process, thus far, is the same as the method shown in FIGS. 4 and 5. However, the process has been clarified such that either carbon dioxide or lime milk, or preferably both (this alternative is shown in the figure), is/are injected in the paper making stock by one or several mixers using specific injection liquids. This type of mixer is described in, e.g., patents U.S. Pat. No. 6,659,636 B1 and U.S. Pat. No. 7,234,857 B1 of Wetend Technologies Oy. Characteristic of the injections implemented in the different embodiments, whether using the TrumpJet® device or some other injection device, is that carbon dioxide and/or lime milk is/are injected in the paper making stock substantially in a transversal direction relative to the direction of paper making stock flow using an injection or feed liquid at a sufficiently high flow velocity that injection liquids/chemical sprays of one or more nozzles cover substantially the cross-section area of the stock flow, whereby the carbon dioxide and/or lime milk is/are distributed practically evenly through the whole suspension, regardless of the presence or absence of the turbulence in the suspension. The above-mentioned term 'substantially in a transversal direction' refers to a direction, which deviates more than 30 degrees from the comparison direction, e.g., from the direction of the flow or the direction of the axis of the piping. As injection liquid the paper making stock is used in the method of FIG. 8. In other words, the small secondary flow is taken from the paper making stock pipe leading to the papermaking machine, and it is pumped to an injector, into which either lime milk or carbon dioxide is injected such that carbon dioxide or lime milk are mixed into the injection liquid substantially simultaneously as the mixture of the thus formed injection liquid and carbon dioxide or lime milk penetrates the paper making stock flowing toward the headbox. The feed velocity of the injection liquid and chemical mixture is 3-15, preferably 5-10 times the velocity of the paper making stock flowing in the stock pipe. The delay from the contact of carbon dioxide or lime milk and the injection liquid to the feed of their mixture to the paper making stock is preferably of the order of 0-0.5 seconds. When the chemical is injected in the stock pipe in the way described above, and the bubble or particle size of the chemical is kept sufficiently low (e.g., for lime milk, below 3 microns, preferably below 1.5 microns, and more preferably below 0.5 microns), it can be trusted that the carbonation reaction will be completed (full conversion has occurred) in less than fifteen seconds, preferably in less than ten seconds, more preferably in less than six seconds, and most preferably in less than three seconds from the beginning of the feeding the latter chemical. The bubble size of carbon dioxide was determined in tests to be sufficiently small in order to ensure rapid material transfer from the gas to the liquid when using the above-described substantially transversal feed together with a high feed velocity (at least three times the flow velocity of the paper making stock). Thus, the bubble size is at least below 10 mm, more preferably below 100 microns. The greater the transversal feed velocity is, the smaller is the carbon dioxide bubble size. Naturally, however, the optimal result is obtained if carbon dioxide, when fed along with the liquid flow, is already dissolved completely in the feed/injection liquid.

FIG. 9 shows a method of producing PCC in the short circulation of a papermaking machine according to a fifth preferred embodiment of the invention. Thick paper making stock formed from different fiber components according to the figure is diluted to a suitable consistency by a filtrate obtained from the papermaking machine, whereupon first carbon dioxide and thereafter lime milk are injected into the diluted fiber suspension. The method according to this embodiment differs from the previous one in that now at least one of the chemicals is injected into the stock flow using as injection liquid some other liquid or suspension than paper making stock diluted to headbox consistency. A stock component is discussed as a first injection liquid alternative. This allows several further alternatives, of course. If a stock component is used as injection liquid for both chemicals, this may be either a secondary flow obtained from the same stock component for both chemicals, or a secondary flow obtained from its own component separately for each chemical, or the use of the stock component as injection liquid as a whole, as shown in FIG. 9 for feeding carbon dioxide. Furthermore, it is possible for the component used as injection liquid to be a mixture of several stock components. It is also possible that the stock component, stock components, or their mixtures, has/have their original consistency, with which they are normally fed to the mixing tank, or it/they may have been diluted to headbox consistency or some other applicable consistency. What has been described above depends on the consistency to which the fiber suspension should originally be diluted, unless another adjustment of the consistency is desired after mixing of the chemical(s). In other words, if the injection liquids are undiluted thick stock components, whose consistency is somewhere in the 3-5% range, then the thick paper making stock should be overdiluted in the mixing tank, so that the consistency of the final fiber suspension would be the desired headbox consistency. If, on the other hand, the component(s) used as injection liquid is/are diluted separately to headbox consistency, e.g., by white water from the papermaking machine, there is no need to take care of stock consistency after final chemical mixing. Naturally, it is clear that when examining consistency, the water coming from the lime milk to the paper making stock needs also to be taken into consideration.

As other injection liquid alternatives, various filter fractions may also be used, such as, e.g., a zero water filter filler fraction, fiber recovery filter fine fraction, zero water or some other filtrate or otherwise applicable liquid. Therefore, various secondary flows, return flows or overflows obtained from the short circulation are also applicable as feed liquid. What was mentioned above concerning the effect of the consistency of the injection liquid naturally also applies to these alternatives. In other words, both the consistency of the injection liquid relative to the headbox consistency and the liquid carried with the lime milk in the paper making stock should be taken into account, as the liquid has its own effect on the final consistency of the paper making stock. Also in the embodiment shown in FIG. 9, the mixing method and equipment of Wetend Technologies Oy described in patents U.S. Pat. No. 6,659,636 B1 U.S. Pat. No. 7,234,857 B1 are preferably used, whereby the delay from the mixing of the chemical and injection liquid to the feeding of this mixture into the paper making stock is of the order of 0 . . . 0.5 s. It should, however, be noticed that the greater amount of various additives, or the like, the injection liquid contains, i.e. the less pure the injection liquid is, the greater is the risk that the impurities will adversely react with the lime milk or carbon dioxide.

FIG. 10 shows a method of producing PCC in the short circulation of a papermaking machine according to a sixth preferred embodiment of the invention. According to the Figure, thick stock formed from different fiber components is diluted to a suitable consistency by a filtrate obtained from the papermaking machine, whereupon carbon dioxide and lime milk are injected in the paper making stock, as was in fact already shown in connection with FIG. 8. In the embodiment according to this figure, following PCC precipitation, one or more fiber components or their mixture may be injected in the fiber suspension. In the injection according to the embodiment shown in the figure, a secondary flow obtained from the fiber suspension moving toward the paper machine headbox is used as injection liquid, although any liquid or suspension may be used. Moreover, an additive such as, e.g., starch, adhesive, etc., may also be injected in the way shown in FIG. 10 into the resulting paper making stock by the same mixer. In connection with the feeding of additives, it is also worth noting that the use of an injection liquid is not necessarily needed for their feed.

FIG. 11 shows a method of producing PCC in the short circulation of a papermaking machine according to a seventh preferred embodiment of the invention. According to the figure the thick stock formed from various fiber components is diluted to a proper consistency by a filtrate obtained from the papermaking machine, before which, first carbon dioxide and thereafter lime milk are mixed with a filtrate used for the dilution and obtained from the papermaking machine. It should also be noted that in order to dissolve carbon dioxide in a filtrate, the amount, the temperature, and the pressure of the filtrate should be preferably kept in proportion to the desired amount of carbon dioxide to be dissolved.

FIG. 12 shows a method of producing PCC in the short circulation of a papermaking machine according to an eighth preferred embodiment of the invention. According to the figure the thick stock formed from various fiber components is diluted to a proper consistency by a filtrate obtained from the papermaking machine, before which, first carbon dioxide and thereafter lime milk are mixed with the filtrate used for the dilution and obtained from the papermaking machine. The difference relative to the method shown in the embodiment of FIG. 11 is that the fiber components in this embodiment are added each as their own fractions to the liquid flow, into which carbon dioxide and lime milk have already been mixed. As regards the precipitation of PCC, the process in the figure operates in exactly the same way as the process in FIG. 11. Moreover, in this embodiment, in order to dissolve carbon dioxide in the filtrate, the amount, the temperature and the pressure of the filtrate should be kept in proportion to the desired amount of carbon dioxide to be dissolved.

FIG. 13 shows a method of producing PCC in the short circulation of a papermaking machine according to a ninth preferred embodiment of the invention. According to the figure the various fiber or additive components used for preparing the paper making stock are mixed as their own flows with the filtrate obtained from the papermaking machine. The figure shows an exemplary situation, in which one stock or additive component is first added to the filtrate obtained from the papermaking machine, followed by the addition of a second stock or additive component along with carbon dioxide, thereafter a third stock or additive component along with lime milk and finally, a fourth stock or additive alone. It is, of course, obvious that if there are fewer than four stock or additive components, some of the components shown above will be left out and, if there are more than four stock or additive components, more feed points will be needed, as well. Actually, two or more stock or additive components may also be added simultaneously, which also falls within the scope of this embodiment. One preferred alternative shows a solution, in which either lime milk or carbon dioxide, or both, are mixed first with a stock component. Thus, this chemical should be precision dosed into the stock component assisting both the PCC precipitation on the exterior surface (so-called surface-loading) and in the fiber lumen (so-called lumen-loading). At the same time, it can be assumed that when actual PCC precipitation occurs, PCC is precipitated for the most part on the surfaces of the stock component concerned. Moreover, it is possible to use as injection liquid at a certain feed point the filtrate obtained from the papermaking machine or a similar diluted fiber suspension, whereby besides injecting the desired chemical, additive, stock component, or the like, the resulting paper making stock consistency may be adjusted. In other words, it is for instance possible to use as carbon dioxide injection liquid the filtrate obtained from the papermaking machine or wire water. As regards lime milk, it may be injected in a papermaking fiber component, if ensuring that the fiber component does not contain pulp of mechanical origin or that lime milk is injected in such a small amount that the pH of the mixture of the fiber component and lime milk will not be able to grow too high. When simultaneously feeding lime milk together with the fiber component being preferably, but not necessarily, mechanically ground pulp, the resulting calcium ions should be mixed with the fiber component, so that the carbonation reaction occurs quite on the surface of the fibers. Thus, the carbonate crystals are distributed evenly on the fiber surface and adhere primarily on the fiber surface rather than to one another. Preferably, additions of the stock or additive component and/or carbon dioxide and lime milk is done by injection, especially preferably by using the TrumpJet® mixing device described in the patents U.S. Pat. No. 6,659,636 B1 and U.S. Pat. No. 7,234,857 B1 of Wetend Technologies Oy.

FIG. 14 shows a method of producing PCC in the short circulation of a papermaking machine according to a tenth preferred embodiment of the invention. In the embodiment of the figure a secondary flow is obtained from the paper making stock flow, in which different fiber components have thus already been mixed, leading to the papermaking machine, and into which first carbon dioxide and thereafter lime milk are injected. Furthermore, when feeding these, it is advantageous to use as feed device the TrumpJet® feed device of Wetend Oy.

The exemplary embodiment represented above, in which carbon dioxide and lime milk are supplied to a smaller liquid volume than in most of the previous embodiments, in which the injection of chemicals is done into a stock whole flow moving to the papermaking machine, gives reason to explain the embodiment in somewhat more detail. Since the amount of liquid, into which especially carbon dioxide is injected, is smaller and especially, if the carbon dioxide amount to be fed is relatively large, it should be kept in mind that only a certain amount of carbon dioxide is able to dissolve under atmospheric or near-atmospheric conditions. Thus, if dissolving a larger amount of carbon dioxide into the secondary flow of the embodiment described in FIG. 14 is desired, the injection should be done at an elevated pressure relative to the pressure in the short circulation. In other words, a pressure in proportion to the amount of dissolved carbon dioxide has to prevail in the secondary flow. The same pressure requirement also applies, if injection of carbon dioxide into a thick stock component, noils, filtrate or an additive flow is desired. Pressurization of the secondary flow requires, e.g., that a check valve 30 and pump 32 be arranged in the secondary line 34, as shown in FIG. 14. Pressurization of the secondary flow may be accomplished such that the pressure of the secondary flow is high enough to directly ensure that a sufficiently large amount of carbon dioxide is dissolved in the flow. Another alternative is to consider that when carbon dioxide reacts with lime milk, the dissolution capacity of the liquid is in a way released, so that carbon dioxide, which is present as bubbles, continuously dissolves in the liquid. In other words, the pressure of the secondary flow need not, in practice, be raised as much as in the first alternative.

In an eleventh preferred embodiment of the invention shown in FIG. 15, PCC is precipitated in a papermaking fiber component before mixing the component with other paper making stock components. In the embodiment of the figure, carbon dioxide is first injected into the component either without injection liquid or by using as injection liquid, e.g., either a filtrate obtained from the papermaking machine, the same fiber component, in which mixing is done, or some other fiber component or applicable stock component, or other liquid flow, whereupon lime milk is injected into the fiber component by using as injection liquid the secondary flow obtained from the fiber component itself. For this embodiment, too, applies that in order to dissolve carbon dioxide in the fiber component, the amount, the temperature and the pressure of the fiber component should be in proportion to the desired amount of carbon dioxide to be dissolved. In other words, the pressurization shown in FIG. 14 is a valid alternative also in this embodiment.

FIG. 16 shows a method for adding carbon dioxide or lime milk to the paper making stock according to a twelfth preferred embodiment of the invention. In the embodiment of the figure, the chemical (in the figure, carbon dioxide) is injected into the thick stock through one or more injection nozzles fastened on the wall of the flow pipe for the thick stock, before the thick stock is diluted to the consistency of the paper machine headbox. In this embodiment, the chemical is fed in very intimate contact with the fibers, thereby obtaining very efficient PCC surface-loading. There is also no risk of the paper making stock darkening, in this embodiment, since the dissolution of carbon dioxide lowers pH such that the lime milk intended for subsequent mixing is no longer able to raise pH to an extent where there would be a risk of darkening of the stock.

FIG. 17 shows a method according to a thirteenth preferred embodiment of the invention for adding carbon dioxide or lime milk to the paper making stock. In the embodiment of the figure, the chemical (lime milk, in the figure) is injected into the thick stock through one or more injection nozzles fastened on the wall of the flow pipe for the thick stock, before the thick stock is diluted to the consistency of the paper machine headbox. Also in this embodiment, the physical laws pertaining to the feeding of lime milk into the paper making stock must be taken into account. In other words, lime milk should not be injected in such great amounts that the mechanical pulp present in the paper making stock or the recycled pulp containing such begins to darken. Naturally, if the paper making stock does not contain pulp with a tendency to darken, these limitations are irrelevant. Another option for preventing paper making stock from darkening is to feed carbon dioxide very quickly after lime milk, so that the paper making stock will not have time to darken.

In addition to the liquid flows described in the above embodiments, either one or both PCC raw material components may be fed to, e.g., various secondary flows, such as to the feed of the subsequent steps of the vortex cleaning plant, to the accept or reject, to the overflow of the gas separation tank or deculator, to the paper machine headbox recirculation flow, to the headbox dilution water, to the feed or accept of the downstream stage of the machine screen, etc.

Injection devices depicted schematically and discussed in the above figures are preferably devices marketed under the brand name TrumpJet® by Wetend Technologies Oy, and devices protected by, e.g., U.S. Pat. Nos. 6,659,636, 7,234,857, of which one design alternative is depicted schematically in FIG. 18. Characteristic of the operation of the devices is that they inject an agent, a chemical or material to be mixed into the main flow substantially in the transversal direction relative to the main flow and into a substantial part of the main flow, whereby even mixing of the agent, chemical or material into the main flow occurs faster than is the case with any other known device. Depending on the size of the flow pipe carrying the main flow and its cross-sectional shape, there may be more than one injection device, e.g., four, arranged at regular intervals on the circumference of the flow pipe. Another substantial characteristic of the injection devices is that the injection of the agent, the chemical coming out of fitting 40 or the material is done by using the injection liquid fed through fitting 42 such that the injection liquid carries the agent to be mixed into the main flow moving in pipe 44. For example, untreated water, various filtrates or fiber suspensions of variable consistencies may be used as the injection liquid. In other words, the mixers feeding lime milk and carbon dioxide discussed above in the embodiments of the figures may preferably use as injection liquid paper machine white water, a fiber-recovery filtrate, paper making stock coming from the mixing tank and flowing to the papermaking machine, or even some papermaking fiber-containing fraction or fiber component, either diluted to the headbox consistency or as thick. Furthermore, the feed, accept, rejection, overflow and bypass flows of various sorters, vortex cleaners, the gas separation and headbox are also applicable.

Our tests showed the most advantageous process solution to be a device setup, in which, through the first injection feed device unit comprising one or more injection feed devices placed on the circumference of the flow pipe, gaseous carbon dioxide is injected by means of an injection or feed liquid into the process liquid moving in a flow pipe at a high flow velocity and substantially transversally relative to the direction of flow of the process liquid. This is followed by the placement of a second injection unit, comprising one or more injection devices placed quite similarly on the circumference of the flow pipe, whereby lime milk is injected in a similar manner into the process liquid at a high flow velocity, substantially transversally to the direction of flow of the process liquid. In order to optimize the process, the injection units are spaced as close to each other as possible such that lime milk is fed to the process liquid in practice while carbon dioxide is still dissolving in the process liquid. This procedure ensures that carbon dioxide dissolves quickly, since in this case practically no part of the process liquid will be saturated by carbon dioxide. Since mixing of the injection units is sufficiently effective, the whole carbon dioxide and lime milk conversion may be performed in less than fifteen, preferably less than ten, more preferably less than six, and most preferably less than three seconds, counted from the moment the injection of lime milk into the process liquid begins. The rapid reaction produces several advantages over the prior art. Now, that the conversion is fast and substantially perfect, the PCC crystals are homogenous, their size distribution is even, and no precipitation process will be able to start.

FIGS. 19a-19d show a mixing profile obtained as a function of time by using a device according to FIG. 18. The test equipment consists of a flow pipe (the diameter of the flow pipe in the paper machine headbox is 800 mm), on whose circumference, injection devices are arranged at regular (90 degree) intervals according to FIG. 18. In the test, a colorant is injected from the injection devices into the liquid flowing in the pipe at a certain flow velocity relative to the flow velocity of the liquid moving in the pipe. FIG. 19a shows the mixing status at a distance of one meter (corresponding to about 0.25 seconds) from the point of injecting the chemical. It can be seen that the chemical already covers one half of the cross section of the pipe or so, although the chemical is not distributed evenly enough over the cross section of the pipe. FIG. 19b shows a mixing profile, one second after feeding the chemical. It can be seen that the chemical is already distributed almost over the whole cross section of the pipe, and that the evenness of the mixture still leaves room for improvement. FIG. 19c shows a mixing profile, two seconds after feeding the chemical. The chemical is mixed so well that the following process step or device could be positioned already at this point. FIG. 19d shows a mixing profile three seconds after feeding the chemical. The mixing level keeps improving, e.g., variations in the concentration of the solution or suspension between peaks are below 10%, and the standard deviation is less than 5%.

FIG. 20 shows the operation of a prior-art feed device, in which a chemical, filler, or the like, are allowed to move at a relatively low pressure differential into the flow pipe. From the descriptor in FIG. 20 (a gently downward sloping straight line starting at the point of feed) and the timeline, it can be seen that one second or so after feeding the additive, it has only spread to a very small portion of the flow cross-section area of the flow pipe, and approximately two seconds after feeding the additive, it has spread, under the influence of the natural turbulence of the flow to about a fifth of the cross-section area of the flow pipe. The lower square of the timeline depicts the mixing degree of the additive at the end of the timeline to the right (6 . . . 20 seconds from feeding). The square shows the additive to be mixed (lighter areas) as still relatively homogenous areas within the main flow. According to measurements, the so-called peak-to-peak variation is more than 50%. Based on practical experience, the prior-art feed device can be used, if the travel from the feed point to the paper machine headbox represents a flow time of about 6 . . . 20 seconds, or in meters, about 20-100 meters.

FIG. 21 shows an analogous representation of a mixture resulting when using a TrumpJet® feed device. In the situation of the figure, five TrumpJet® feed devices are arranged on the circumference of the feed pipe at equal intervals in the circumferential direction, and a colorant is fed to the flow pipe at a given flow velocity relative to the flow velocity of the liquid moving in the flow pipe. The cross section of the flow pipe below the timeline of the figure shows how already about one second after feeding the additive, it has spread to a substantial part (about 90%) of the cross-section area of the flow pipe. Two seconds after feeding the additive, it has spread practically evenly in the flow and after a three second interval, the chemical has already been mixed sufficiently evenly for most applications. The square below the timeline shows the mixing degree of the additive three seconds after feeding the additive. Peak-to-peak variation according to measurements is below the 10% range, and already two seconds after feeding, below 15%. Therefore, in the conventional applications, the distance of the TrumpJet® feed device from the headbox need only be 5-15 meters considering that mixing occurs to some degree also in the headbox piping. It is true, as in the present invention, in which even mixing is only a prerequisite for a quick and advantageous progress of the carbonation reaction, that time needs to be reserved for a proper reaction after the mixing, because the reaction must not continue in the headbox piping.

It was already mentioned above that in the production of PCC, injection feed units may be spaced relatively closely on the wall of the flow pipe. The facts shown in connection with the above FIGS. 19 and 21 enable the injection feed units to be placed in the best case scenario on the same circumference of the pipe. In other words, the injection nozzles for carbon dioxide and lime milk are placed, e.g., alternately on the same circumference of the flow pipe. In such a design, it is a clear advantage if, e.g., lime milk is very finely dispersed and/or carbon dioxide is dissolved in the injection liquid in advance. This being the case, it is clear that the injection feed units may be spaced very closely together successively on the wall of the flow pipe. FIG. 21 teaches, for example, that the lime milk injection feed unit may be situated some 1-3 seconds away from the previous carbon dioxide injection feed unit. It should, however, be considered that it is not possible in all conceivable circumstances to place the injection feed units at such close intervals, but even in the worst case scenario, 15 seconds or less will suffice, as calculated by means of the flow velocity of the paper making stock moving in the flow pipe.

The injection feed units and reaction zone following such may be seen as constituting a pipe reactor used in the production of PCC, and whose dimensions are discussed below. As was already mentioned above, the spacing in seconds between the first and second injection feed unit is below 15, and preferably below 3 seconds. Similarly, it was previously mentioned that the length of the reaction zone from the feed of the latter chemical until its substantially complete conversion to PCC, as likewise measured by the flow velocity of the paper making stock, is below 15, preferably below 10, more preferably below 6, and most preferably below 3 seconds. In other words, the length of the pipe reactor is below 30 seconds, preferably below 18 seconds, and more preferably below 9 seconds. The length depends primarily on the chemical feed order (the mass transfer of lime milk is slower than that of carbon dioxide), the bubble and particle size of the chemicals, and the chemicals injection velocity.

The embodiments disclosed above describe exclusively PCC precipitation to paper making stock. However, since many other additives or chemicals also need to be used in paper production, a few such preferred feed points as compared with PCC precipitation will be reviewed below. According to a preferred embodiment of the invention, all or at least substantially all chemicals needed in the wet end of a papermaking machine are dosed after the precipitation of PCC. Mainly retention chemicals, such as polymer, bentonite, and silicate, various glues, special pigments, optical brightener and defoaming agent are relevant here. On the other hand, in some circumstances, there is also reason to feed a part of the chemicals before precipitation of PCC.

It can be understood from the numerous embodiments shown above that the injections may be performed by spraying the liquid or gas to be mixed with the flow using a specific feed or injection liquid for the flow. Furthermore, it is readily understandable that the injection or feed liquid in practice may be any liquid starting with clean water, various clear or turbid filtrates formed in the fiber web production or processes in connection therewith, up to fiber suspensions or their combinations containing various fiber components. Moreover, as feed liquid it is possible to use applicable flows obtained from various sorting devices or vortex cleaners. As the most preferred injection liquid, paper making stock is used.

At this stage, it is also worth noting that the objects of the present invention, i.e., the homogenous size distribution of the calcium carbonate crystals, the prevention of the formation of oversized PCC crystals, PCC agglomerations and PCC precipitations, as well as the control of carbon dioxide and lime milk carbonation reaction may be realized, besides by the technique based on transversal injection described above, by a few other solutions. One alternative is to inject the chemicals to be used in the direction of the flow pipe (i.e., either parallel with the flow or directly against the flow), whereby in some fashion, e.g., by placing a sufficient amount of static or dynamic (e.g., rotating or rotatable) mixing elements after the injection device(s), sufficiently fast mixing is obtained as required by the invention. A second alternative is to feed a chemical in a conventional way, e.g., into the effective range of a rotating mechanical mixer or pump, such that the mixing efficiency is sufficient for the chemical to be mixed evenly through the whole volume. The alternatives disclosed above may be used for either or both chemicals (carbon dioxide and lime milk) that are to be fed.

The characteristics or the source of the chemical has not been discussed at all, yet. However, it should be noticed that the invention may use either pure carbon dioxide or carbon dioxide separated or obtained from the flue gas of a $CO_2$ recovery plant or other similar sources. Likewise, lime milk may be produced in situ from unslaked lime or possibly brought from a chemical recovery plant of a pulp mill nearby. Tests have shown the benefits of using lime milk at process temperature (the headbox temperature or the temperature of lime milk, e.g., either after slaking or when obtained from the recovery plant), typically 40-80° C. Warm lime milk effectively prevents, e.g., the formation of precipitations and microbial growth. Moreover, compared with the prior-art processes with their abundant use of energy for cooling, the in-line PCC production according to the invention is remarkably more energy-efficient than the prior-art processes.

In connection with the various embodiments for the production of PCC shown above, e.g., the following control system may be used. The amount of filler may be considered as one criterion. In other words, when a certain amount of filler formation is desired, the dosing of either carbon dioxide or lime milk is determined numerically such that the desired PCC amount is obtained. Thereafter, a second chemical feed is arranged in proportion to the second numerically determined dosing. This relatively simple control system is applicable, when the amount of PCC is rather small i.e. when not attempting to dose carbon dioxide in an amount exceeding what can be dissolved in the available liquid.

If the intention is to develop a maximum amount of PCC, the continuous PCC production control system will be based on the fact that a numerical value is set for the upper limit of the amount of carbon dioxide to be fed to the process, at which value carbon dioxide dissolves completely in the liquid. However, it is also possible to imagine, especially in a situation, in which carbon dioxide and lime milk are injected substantially simultaneously, thereby allowing them to react immediately, that the reaction of carbon dioxide with lime milk releases the dissolution capacity of carbon dioxide, potentially allowing for a carbon dioxide overdose of, e.g., around 10-20%. Of course, it must be taken into account that the solubility of carbon dioxide depends on the pressure and temperature, as well as the pH value of the liquid. However, since in a practical situation, we are operating within a relatively small pH range, the effect of pH is not included in the control system. The value calculated from the stoichiometric ratio of lime milk and carbon dioxide reduced by 5% is set as the upper limit for the amount of calcium hydroxide ($Ca(OH)_2$) according to the calcium carbonate production formula i.e., the amount of $Ca(OH)_2$ is $mCa(OH)_2/mCO_2-5\%=56/44-5\%=1.2\times$ the amount of $CO_2$. The five-percent reduction is due to the desire of always ensuring a small excessive amount of carbon dioxide. When these allowed upper limits for the source materials have been set accordingly, the set value for the amount of PCC may be input in the control system, based on which the control system controls both the lime milk and carbon dioxide feed amount. In the calculation, the ratio between $Ca(OH)_2$ and $CO_2$ is cascade connected relative to one another. This means that if one or more feed amounts are too big with respect to the upper limits provided for the aforementioned control system, the control circuit prevents the input of an excessive PCC set value. Thus, the control system may be programmed either to request a new PCC set value or calculate a maximum allowed PCC set value.

The control system, furthermore, comprises that the PCC production process is provided with both a measurement of pH and conductivity of the lime milk before the PCC production, and a measurement of the pH and conductivity of resulting PCC. The meters following the PCC production are provided with limit values specifying that under normal conditions, PCC production should occur within a certain pH and conductivity corridor determined depending on the application. If the limits are exceeded one way or the other, the control system will be steered toward a balanced state by adjusting the $CO_2$ amount. If exceeding the alarm limits outside the limit values, an alarm is provided, and the PCC production control transfers to manual control. Following PCC precipitation, the pH value is remeasured. If pH drifts upward by 0.5 units relative to the previous pH measurement, the product will then be acidified either by a small amount of carbonic acid, or some other weak acid.

It is obvious from the above description, that a new process which is clearly different from the prior-art processes has been developed. It should be understood from the various embodiments shown above that these by no means should be construed as limiting the invention in terms of its scope, as disclosed in the attached claims. It is likewise clear that the details of the various embodiments of the invention may be implemented in other embodiments provided this is technically feasible.

The invention claimed is:

1. A method for crystallizing calcium carbonate, in a short circulation of a fiber web machine, the method comprising:
   (a) obtaining filtrate from the fiber web machine,
   (b) preparing paper making stock from at least said filtrate and various fiber components,
   (c) pumping said paper making stock from its preparation towards the fiber web machine, and
   (d) providing the paper making stock with calcium carbonate crystals by feeding carbon dioxide and milk of lime into the short circulation of the fiber web machine and letting the carbon dioxide and milk of lime to react with one another, wherein the step of providing the paper making stock with calcium carbonate crystals comprises mixing at least either carbon dioxide or milk of lime into a liquid flow comprising at least one of at least one fiber component, filler component and paper making stock by
   (i) injecting the at least either carbon dioxide or milk of lime from one or several nozzles into the liquid flow by using as a feed or injection liquid at least one of the following:
      a filtrate obtained from a fiber web machine,
      a clear or turbid filtrate obtained from a fiber web machine,
      a fiber suspension used for producing a fiber web,
      a fiber or other component of a fiber suspension used in the fiber web production,
      an accept flow, a reject flow, an overflow or a bypass flow of a short-circulation, and
      clean water,
   (ii) performing the injecting in a direction substantially transverse to a direction of liquid flow, and substantially at a feed velocity that is higher than a flow velocity of the liquid; wherein
   (iii) the injecting taking place as sufficiently small-sized particles or bubbles such that
      the at least either carbon dioxide or milk of lime is spread substantially evenly into the liquid flow independently of the flow conditions of the liquid flow, and such that
      the crystallization reaction on the surfaces of fibres substantially completes in less than fifteen seconds, thereby achieving an applicable size distribution of the homogenous calcium carbonate crystals, preventing the formation of oversized PCC crystals, PCC agglomerations and PCC precipitations, and thus enabling improved runnability of a fiber web machine.

2. A method according to claim 1 wherein the crystallization reaction on the surfaces of fibers substantially completes in less than three seconds.

3. A method according to claim 1, wherein the feed velocity used in the injection is a minimum of three and a maximum of fifteen times the flow velocity of the liquid flow.

4. A method according to claim 1, wherein the average particle size of milk of lime is less than 3 μm.

5. A method according to claim 4, wherein the average particle size of the milk of lime is less than 0.5 μm.

6. A method according to claim 1, wherein the bubble size of carbon dioxide is less than 100 μm.

7. A method according to claim 1, wherein the carbon dioxide is dissolved completely in the injection liquid, when introduced in the liquid flow.

8. A method according to claim 1, wherein the liquid flow is a filtrate flow containing solids.

9. A method according to claim 1, wherein both carbon dioxide and milk of lime are injected in the filtrate.

10. A method according to claim 1, wherein at least either carbon dioxide or milk of lime is injected into the liquid flow by taking from the liquid flow a secondary flow, into which carbon dioxide or milk of lime is injected, by using as injection liquid a fiber component of the fiber web production, whereupon the secondary flow is fed to the liquid flow.

11. A method according to claim 1, wherein at least either carbon dioxide or milk of lime is injected into the liquid flow by taking from the liquid flow a secondary flow, into which carbon dioxide or milk of lime is injected by using as injection liquid a thick stock component of the fiber web production, whereupon the secondary flow is fed to the liquid flow.

12. A method according to claim 1, wherein at least either carbon dioxide or milk of lime is injected into the liquid flow by taking from the liquid flow a secondary flow, into which carbon dioxide or milk of lime is injected by using as injection liquid a clear or turbid filtrate of the fiber web production, whereupon the secondary flow is fed to the liquid flow.

13. A method according to claim 1, wherein at least either carbon dioxide or milk of lime is injected into the liquid flow by injecting the carbon dioxide or milk of lime separately or mixed together into a fiber component used in the fiber web production, whereupon the formed suspension is fed to the liquid flow.

14. A method according to claim 1, which comprises injecting another papermaking additive into the liquid flow along with the carbon dioxide and/or milk of lime.

15. A method according to claim 1, wherein the carbon dioxide is injected into the liquid flow and allowed to dissolve therein before injecting the milk of lime.

16. A method according to claim 1, wherein the feed amount of carbon dioxide and/or milk of lime is adjusted as a function of the desired PCC amount so that the amount of the first chemical, carbon dioxide or milk of lime is determined numerically based on the initially desired amount of PCC, whereupon the feed of the second chemical, milk of lime or carbon dioxide is controlled relative to the feed of the first chemical.

17. A method according to claim 1, wherein the milk of lime is fed to the liquid flow at process temperature.

18. A method according to claim 17, wherein the milk of lime is fed to the liquid flow at a temperature of 40-80° C.

19. A method according to claim 1, wherein the interval between feeding the carbon dioxide and feeding milk of lime is less than 15 seconds.

20. A method according to claim 1, wherein the carbon dioxide and milk of lime are fed substantially simultaneously into a liquid flow.

21. A method according to claim 1, wherein the carbon dioxide or milk of lime is injected into a liquid flow parallel with the flow or directly against the flow.

* * * * *